US012617486B2

(12) United States Patent
Nakata

(10) Patent No.: US 12,617,486 B2
(45) Date of Patent: May 5, 2026

(54) ELECTRIC VEHICLE

(71) Applicant: HONDA MOTOR CO., LTD., Tokyo (JP)

(72) Inventor: Keisuke Nakata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 18/611,168

(22) Filed: Mar. 20, 2024

(65) Prior Publication Data

US 2024/0326615 A1     Oct. 3, 2024

(30) Foreign Application Priority Data

Mar. 31, 2023     (JP) .................................. 2023-059256

(51) Int. Cl.
| | |
|---|---|
| *B62J 43/20* | (2020.01) |
| *B60L 50/60* | (2019.01) |
| *B60L 50/64* | (2019.01) |
| *B60L 58/26* | (2019.01) |
| *B62J 41/00* | (2020.01) |
| *B62J 43/16* | (2020.01) |

(52) U.S. Cl.
CPC ............... *B62J 43/20* (2020.02); *B60L 50/64* (2019.02); *B60L 50/66* (2019.02); *B60L 58/26* (2019.02); *B62J 41/00* (2020.02); *B62J 43/16* (2020.02); *B60L 2200/12* (2013.01)

(58) Field of Classification Search
CPC .......... B60L 50/66; B60L 50/64; B60L 58/26; B60L 2200/12; B62J 43/20; B62J 1641/00
See application file for complete search history.

(56) References Cited

U.S. PATENT DOCUMENTS

| | | | |
|---|---|---|---|
| 2013/0264134 A1 | 10/2013 | Matsuda | |
| 2013/0277133 A1* | 10/2013 | Matsuda ................ | B62K 19/30 180/220 |
| 2020/0101833 A1 | 4/2020 | Matsushima et al. | |

(Continued)

FOREIGN PATENT DOCUMENTS

| | | |
|---|---|---|
| JP | 2020-50175 A | 4/2020 |
| WO | 2012/063292 A1 | 5/2012 |
| WO | 2019/049462 A1 | 3/2019 |

(Continued)

OTHER PUBLICATIONS

Japanese Office Action dated Oct. 22, 2024 issued in corresponding Japanese application No. 2023-059256; English machine translation included (7 pages).

(Continued)

*Primary Examiner* — Timothy Hannon
(74) *Attorney, Agent, or Firm* — Rankin, Hill & Clark LLP

(57) ABSTRACT

An electric vehicle comprises: a vehicle body frame that includes a down frame and a pivot frame, the down frame extending downward from a head pipe, the pivot frame pivotally supporting a rear wheel; a battery that is disposed in an extending manner between the down frame and the pivot frame; and a radiator that cools an electric vehicle functional part. In the electric vehicle, the battery is disposed such that a rear side of a battery bottom surface is lower than a front side of the battery bottom surface, and the radiator is disposed below the battery bottom surface.

9 Claims, 16 Drawing Sheets

(56) References Cited

U.S. PATENT DOCUMENTS

2020/0172196 A1    6/2020  Futamata et al.

FOREIGN PATENT DOCUMENTS

| | | |
|---|---|---|
| WO | 2019/065474 A1 | 4/2019 |
| WO | 2019/186749 A1 | 10/2019 |
| WO | 2020/136783 A1 | 7/2020 |
| WO | 2023/007971 A1 | 2/2023 |

OTHER PUBLICATIONS

Indonesian Office Action dated Jan. 20, 2026 issued in corresponding Indonesian application No. P00202402710; English machine translation included (4 pages).

* cited by examiner

UP

LH

ELECTRIC VEHICLE

INCORPORATION BY REFERENCE

The present application claims priority under 35 U.S.C. § 119 to Japanese Patent Application No. 2023-059256 filed on Mar. 31, 2023. The content of the application is incorporated herein by reference in its entirety.

TECHNICAL FIELD

The present invention relates to an electric vehicle.

BACKGROUND ART

Conventionally, there has been known an electric vehicle that includes a battery, and a motor that drives a rear wheel using electricity from the battery (see patent document 1). Patent document 1 describes an electric vehicle that includes: a down frame that extends downward from a head pipe; and a pivot frame that suspends the rear wheel, and includes a battery extending between the down frame and the pivot frame, in which a radiator that cools the motor is disposed below a seat.

PRIOR ART

Patent Document

Patent Document 1
  International publication No. WO2019/049462

SUMMARY OF THE INVENTION

Technical Problem

In general, an electric motor requires a battery having a large capacity for increasing a cruising distance. Accordingly, in an electric vehicle that includes a battery extending between a down frame and a pivot frame, the layout of functional parts is difficult because of the battery. In the technique described in patent document 1, a radiator fan is provided for imparting air guiding property to a radiator, thereby the degree of freedom in the layout of the radiator is ensured, and the radiator is disposed below a seat. On the other hand, if the radiator could be disposed at a position where the radiator can easily receive a larger amount of air, it is advantageous from a viewpoint of cooling property.

The present invention has been made in view of such circumstances, and it is an object of the present invention to provide an arrangement structure of a radiator that can easily receive traveling air in an electric vehicle that includes a battery extending between a down frame and a pivot frame.

Solution to Problem

An electric vehicle comprises: a vehicle body frame that includes a down frame and a pivot frame, the down frame extending downward from a head pipe, the pivot frame pivotally supporting a rear wheel; a battery that is disposed in an extending manner between the down frame and the pivot frame; and a radiator that cools an electric vehicle functional part. In the electric vehicle, the battery is disposed such that a rear side of a battery bottom surface is lower than a front side of the battery bottom surface, and the radiator is disposed below the battery bottom surface.

Advantageous Effects of Invention

It is possible to provide an arrangement structure of a radiator that can easily receive traveling air in an electric vehicle that includes a battery extending between a down frame and a pivot frame.

DESCRIPTION OF EMBODIMENTS

The following describes an embodiment of the present invention with reference to the drawings. Note that, in the description, descriptions on directions such as front and rear, right and left, and upper and lower are identical to directions with respect to a vehicle body insofar as descriptions are not particularly given. Reference sign FR illustrated in each drawing indicates a front side of the vehicle body, reference sign UP indicates an upper side of the vehicle body, and reference sign LH indicates a left side of the vehicle body.

Embodiment

Figure 1:
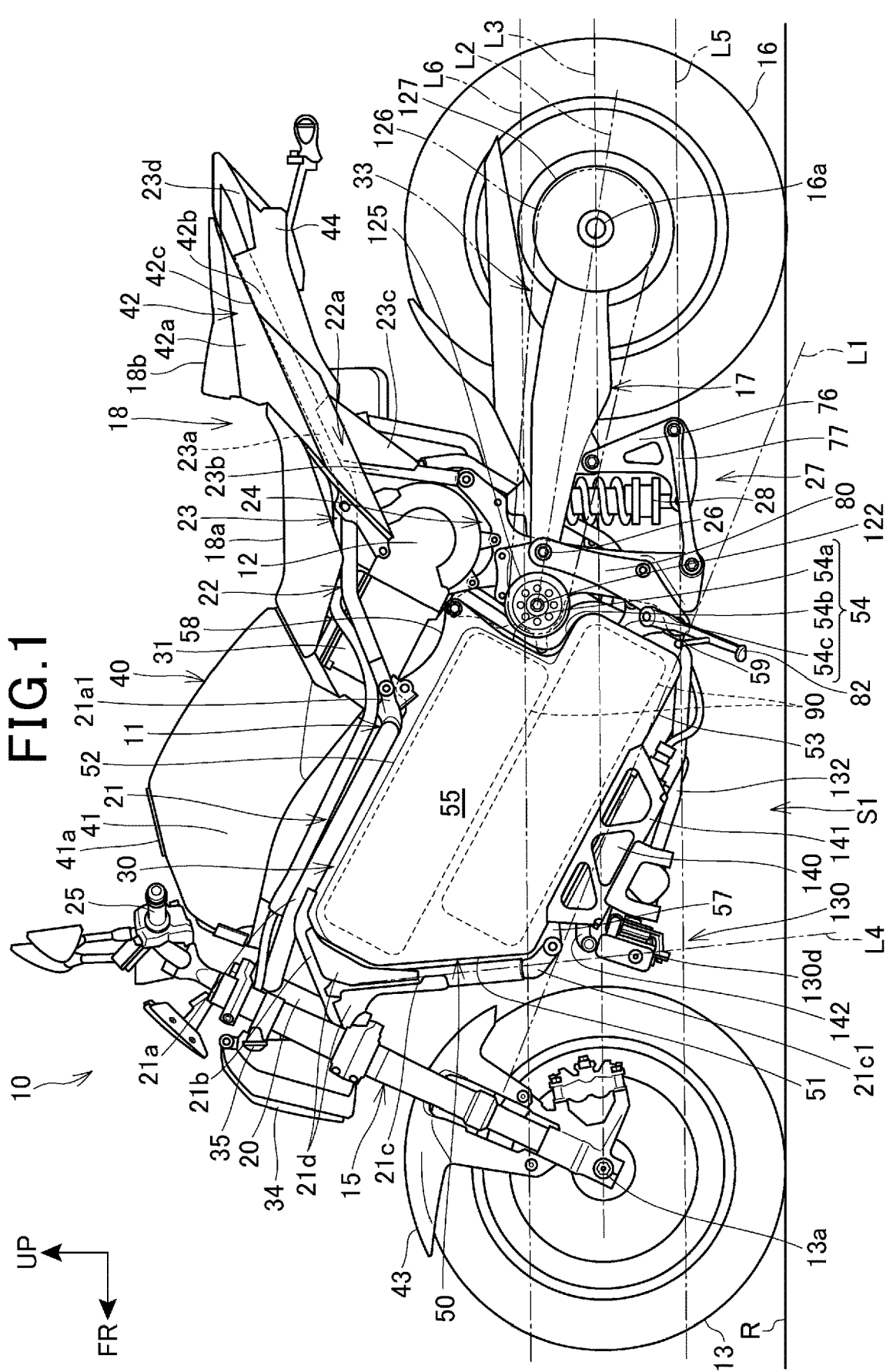
FIG. 1 is a left side view of an electric two-wheeled vehicle according to an embodiment of a present invention.
Figure 2:
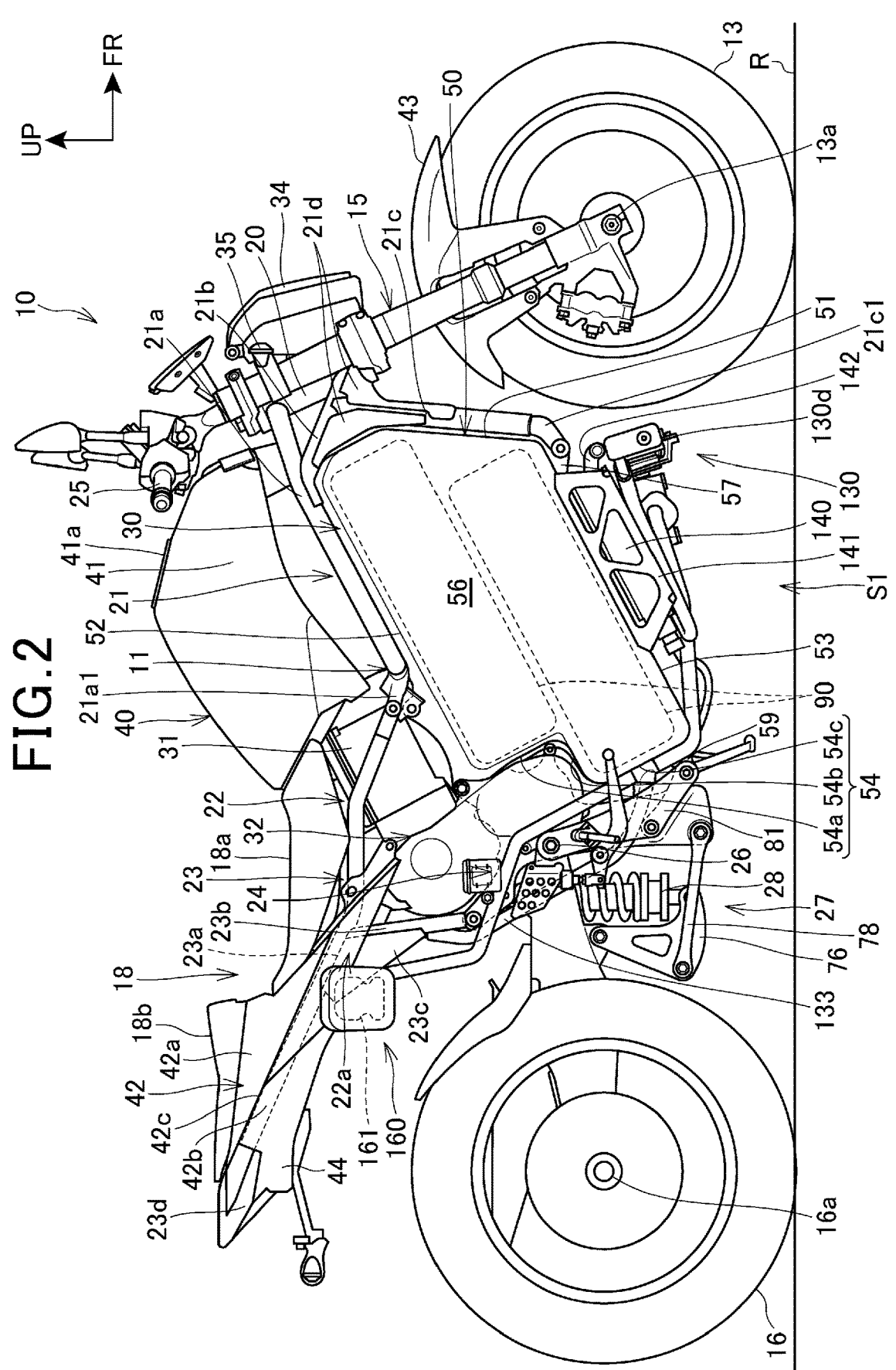
FIG. 2 is a right side view of the electric two-wheeled vehicle according to the embodiment of the present invention.
Figure 3:
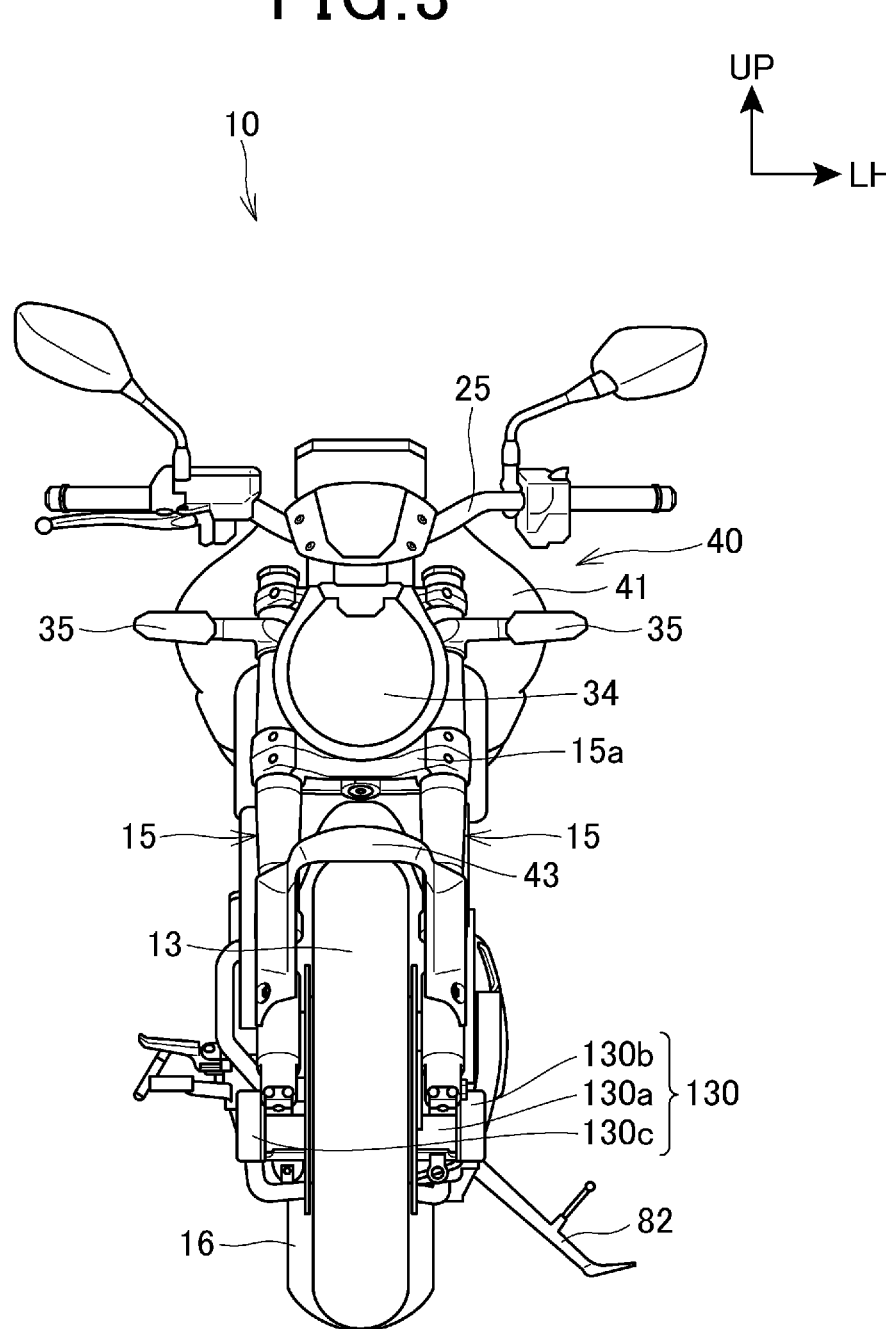
FIG. 3 is a front view of the electric two-wheeled vehicle according to the embodiment of the present invention.
Figure 4:
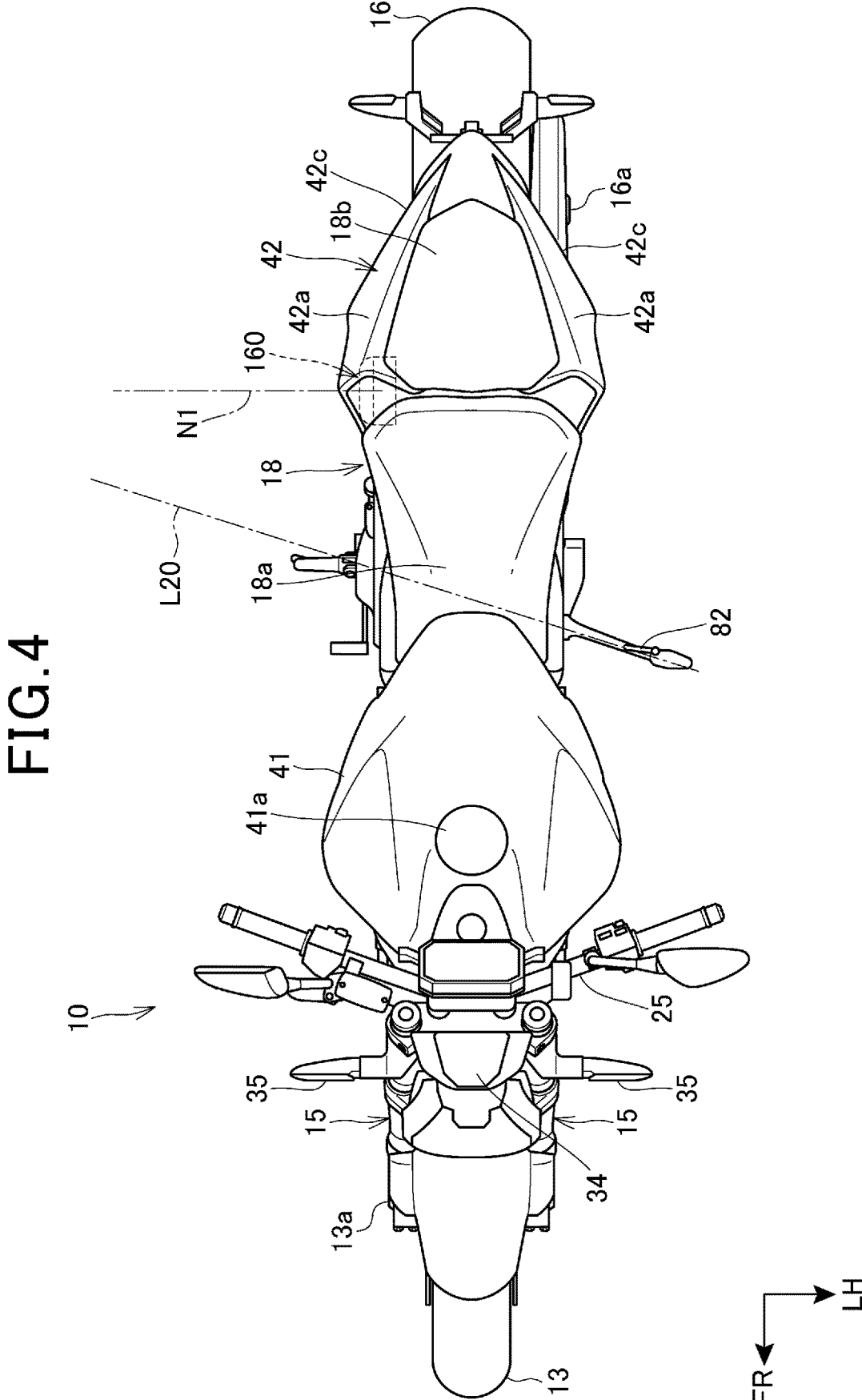
FIG. 4 is a plan view of the electric two-wheeled vehicle according to the embodiment of the present invention.
Figure 5:
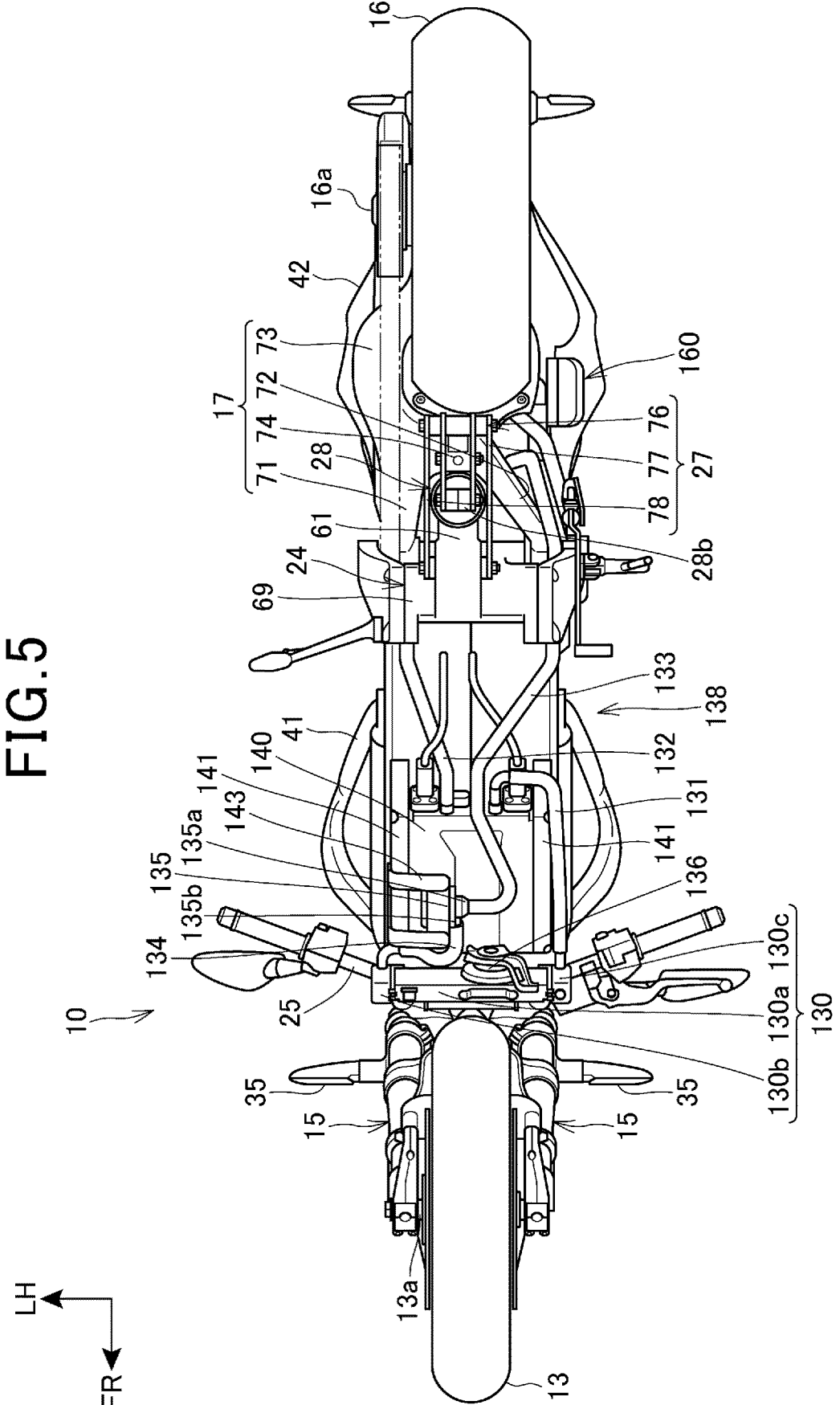
FIG. 5 is a bottom plan view of the electric two-wheeled vehicle according to the embodiment of the present invention.

FIG. 1 is a left side view of an electric two-wheeled vehicle 10 according to an embodiment of a present invention. FIG. 2 is a right side view of the electric two-wheeled vehicle 10 according to the embodiment of the present invention. FIG. 3 is a front view of the electric two-wheeled vehicle 10 according to the embodiment of the present invention. FIG. 4 is a plan view of the electric two-wheeled vehicle 10 according to the embodiment of the present invention. FIG. 5 is a bottom plan view of the electric two-wheeled vehicle 10 according to the embodiment of the present invention.

The electric two-wheeled vehicle 10 (electric vehicle) 10 is a saddle riding vehicle where an electric motor (motor) 12 of a battery drive type is supported by a vehicle body frame 11, a front fork 15 that supports a front wheel 13 is steerably supported by a front end of the vehicle body frame 11, a swing arm 17 that supports a rear wheel 16 is swingably supported by a rear portion of the vehicle body frame 11, and a seat 18 on which an occupant is seated in a straddling manner is supported above a rear portion of the vehicle body frame 11.

The vehicle body frame 11 includes a head pipe 20 that is mounted on a front end portion, a front frame 21 that is positioned behind the head pipe 20, and a rear frame 22 that is positioned behind the front frame 21.

The front fork 15 is steerably mounted on the head pipe 20. A steering handlebar 25 is mounted on an upper portion of the front fork 15. A front wheel 13 is supported on a lower end portion of the front fork 15 by way of a front wheel shaft (axis) 13*a*.

The swing arm 17 is supported on a pivot shaft 26 that is supported on the rear frame 22. The pivot shaft 26 is a shaft that extends horizontally in a vehicle width direction. The swing arm 17 swings vertically about the pivot shaft 26. A rear cushion 28 is connected to the swing arm 17 by way of a link mechanism 27. The rear wheel 16 is supported on a rear end portion of the swing arm 17 by way of a rear wheel shaft (axis) 16*a*.

The seat 18 is disposed above the rear frame 22. The seat 18 is supported on the rear frame 22. The seat 18 includes a rider seat 18*a* on a front side and a passenger seat 18*b* that is disposed behind the rider seat 18*a* and above the rider seat 18*a*.

A battery 30 is supported on the front frame 21. A power control unit (PCU) 31 is disposed above the battery 30. The PCU 31 is configured to include an inverter and the like, for example, converts a direct current electricity supplied from the battery 30 to an alternative current electricity, and supplies the alternative current electricity after conversion to the electric motor 12. Further, the PCU 31, at the time of regenerating the electric motor 12, converts alternative current electricity that the electric motor 12 generates into the direct current electricity, and charges the battery 30 with electricity. The PCU 31 controls the electric motor 12 in response to a manipulation of the electric two-wheeled vehicle 10.

The electric motor 12 is disposed behind the PCU 31. The electric motor 12 is disposed above the pivot shaft 26. A speed reduction gear 32 (see FIG. 2) is disposed on a side of the electric motor 12. The electric motor 12 transmits a drive force to the power transmission mechanism 33 (see FIG. 1) by way of the speed reduction gear 32. The power transmission mechanism 33 transmits a drive force from the electric motor 12 to the rear wheel 16.

A headlight 34 is supported on the front fork 15. A pair of left and right front blinkers 35 is supported on a rear upper portion of the headlight 34.

The vehicle body frame 11 includes a vehicle body cover 40.

The vehicle body cover 40 of this embodiment includes: a unit cowl 41 that is disposed above the front frame 21; and a rear cowl 42 that is supported on the rear frame 22.

The unit cowl 41 is a bowl-shaped cover that is recessed downward. The unit cowl 41 has an external appearance shape that stimulates a fuel tank of the saddle riding vehicle having an internal combustion engine. The unit cowl 41 is disposed between the steering handlebar 25 and the seat 18. The unit cowl 41 covers a front portion of the electric two-wheeled vehicle 10 from above. A lock mechanism 41*a* is disposed on an upper surface of the unit cowl 41. The unit cowl 41 is detachably mounted on a vehicle body by a manipulation of the lock mechanism 41*a*.

The rear cowl 42 is disposed between the seat 18 and the rear wheel 16. The rear cowl 42 covers a lower side of the seat 18 from a side of the vehicle body. The rear cowl 42 includes: upper surfaces (first surfaces) 42*a* that extend from the lower side of the seat 18 toward the outside in the vehicle width direction. Lower surfaces (second surfaces) 42*b* that extend toward the inside in the vehicle width direction as the lower surfaces 42*b* extend downward are formed on outer ends of the upper surfaces 42*a* in a vehicle width direction. A connecting portion between the upper surface 42*a* and the lower surface 42*b* is formed in a shape protruding toward the outside in the vehicle width direction, and forms a ridge 42*c* of the rear cowl 42.

A front fender 43 that covers the front wheel 13 from above is mounted on the front fork 15. A rear fender 44 that covers the rear wheel 16 from above is mounted on the rear frame 22.

Figure 6:
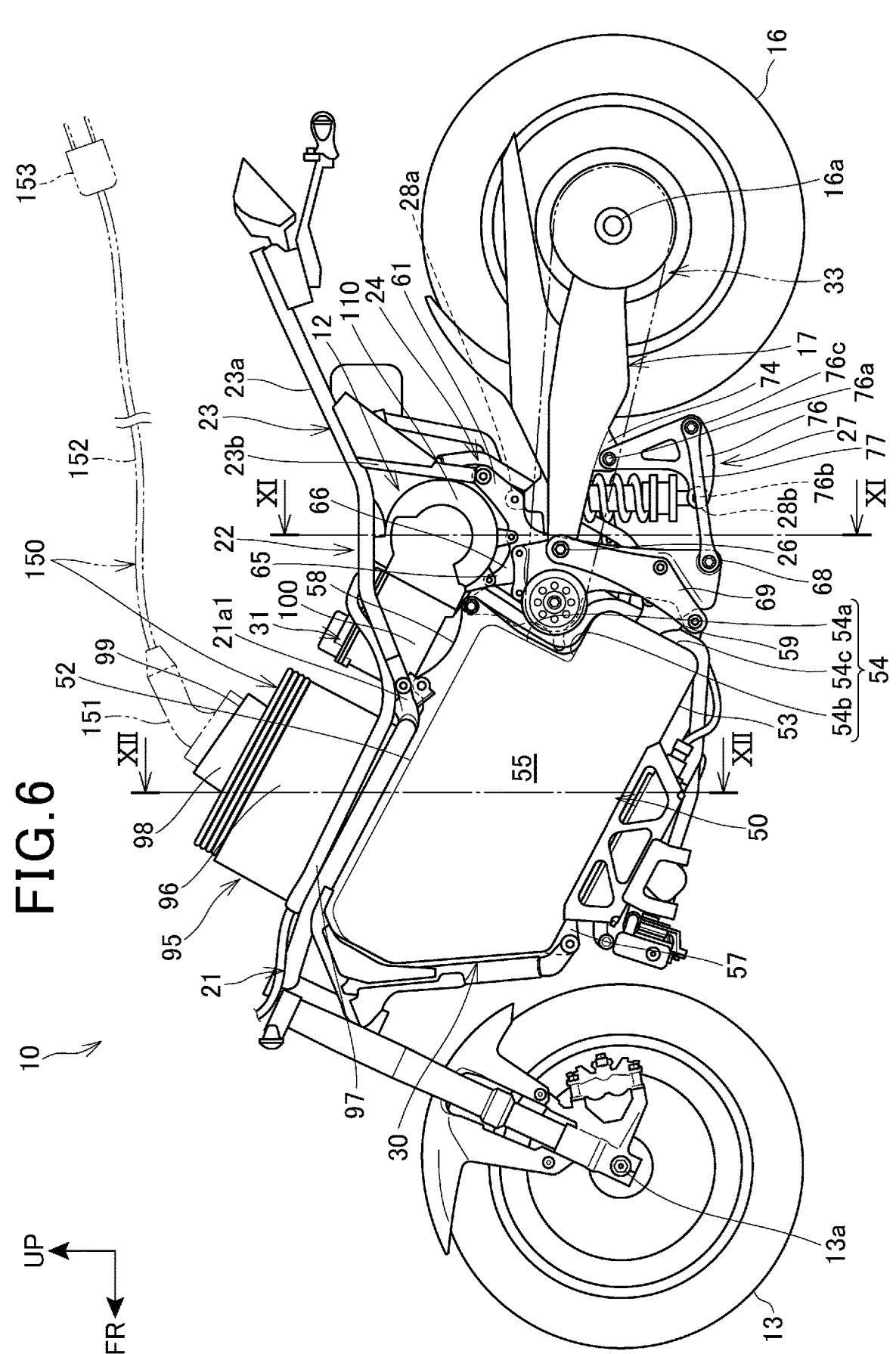
FIG. 6 is a left side view illustrating a main part of the electric two-wheeled vehicle in which the illustration of vehicle body cover is omitted.

FIG. 6 is a left side view illustrating a main part of the electric two-wheeled vehicle 10 in a state where the vehicle body cover 40 is omitted. As illustrated in FIG. 1 to FIG. 6, in the vehicle body frame 11 according to the present embodiment, the front frame 21 and the rear frame 22 are formed as separate bodies from each other. That is, the front frame 21 and the rear frame 22 are configured to be dividable in the longitudinal direction.

Further, the rear frame 22 according to the present embodiment includes a seat frame 23 on an upper side and a pivot frame 24 on a lower side. In the rear frame 22 according to the present embodiment, the seat frame 23 and the pivot frame 24 are formed as separate bodies from each other. That is, the seat frame 23 and the pivot frame 24 are configured to be dividable vertically.

The front frame 21 extends rearward from the head pipe 20.

The front frame 21 includes a pair of left and right upper frames (main frames) 21*a* that extends rearward and downward from an upper end portion of the head pipe 20. Front end portions of the upper frames 21*a* extend toward the outside in the vehicle width direction as the upper frames 21*a* advance rearward, and at portions behind the front end portions, the upper frames 21*a* extend in a straight-line shape rearward and downward. A connecting portion 21*a*1 is formed on a rear end portion of the upper frame 21*a*.

To lower portions of the front end portions of the upper frame 21*a*, a pair of left and right sub frames 21*b* that extends rearward and upward from a lower end portion of the head pipe 20 is connected. Rear end portions of the sub frames 21*b* are connected to the respectively corresponding upper frames 21*a*.

To lower portions of the front end portions of the sub frames 21*b*, a pair left and right down frames 21*c* that extends downward from the head pipe 20 is connected. The down frames 21*c* are connect to a lower end portion of the head pipe 20 by way of the sub frames 21*b*. The down frames 21*c*, as viewed in a side view of the vehicle, extend rearward and downward in a straight-line shape. As viewed in a side view of the vehicle, the down frames 21*c* extend downward at a steeper inclination than the upper frames 21*a*. Battery support portions 21*c*1 are formed on lower end portions of the down frames 21*c*.

A connecting portion between the sub frame 21b and the down frame 21c is reinforced by a gusset 21d.

The front frame 21 according to the present embodiment is constituted of the upper frames 21a, the sub frames 21b, the down frames 21c and the gussets 21d. In the front frame 21, the upper frames 21a, the sub frames 21b and the down frames 21c are formed in a pipe shape.

The rear frame 22 is connected to the connecting portion 21a1 of the rear end portion of the upper frame 21a. More specifically, the seat frame 23 of the rear frame 22 is connected to the connecting portion 21a1. The seat frame 23 is fastened to the connecting portion 21a1 of the upper frame 21a by a fastening member. The fastening member is a bolt, for example.

The seat frame 23 includes a pair of left and right seat rails 23a that extends rearward and upward. The seat rails 23a extend rearward and upward from the pair of respective left and right upper frames 21a. The seat rails 23a extend to a rear end portion of the vehicle body. The seat 18 is supported above the seat rails 23a. The seat rails 23a are covered by the rear cowl 42 from the left and right sides.

Seat sub frames 23b that extend downward are connected to intermediate portion of the pair of left and right seat rails 23a in the longitudinal direction, respectively. The seat sub frames 23b extend frontward and downward at inclination steeper than inclination of the seat rails 23a, and are connected to the pivot frame 24 that forms a frame different from the seat rails 23a. In other words, the seat sub frames 23b extend rearward and upward from the pivot frame 24, and support the seat rails 23a.

Connecting portions 22a between the pivot frame 24 and the seat sub frames 23b are reinforced by rear gussets 23c. The rear gusset 23c is a plate member having an approximately triangular shape as viewed in a side view of the vehicle. The rear gussets 23c are arranged along a rear sides of upper end portions of the seat sub frames 23b and along lower portions of the seat rails 23a, and are welded so as to cover upper end portions of the seat sub frames 23b and lower portions of the seat rails 23a from sides of the vehicle. Behind the connecting portions 22a, grab rails 23d are mounted on the seat rails 23a. Due to such a configuration, the seat frames 23 that support the seat 18 are disposed in a straddling manner in the longitudinal direction between the upper frames 21a and the pivot frames 24.

The seat frame 23 of this embodiment is constituted of the seat rails 23a, the seat sub frames 23b, the rear gussets 23c, and the grab rails 23d. In the seat frame 23, the seat rails 23a and the seat sub frames 23b are formed in a pipe shape.

A battery case 50 that is an exterior member of the battery 30 is supported by the front frames 21 and the pivot frames 24. The battery case 50 has a hollow box shape. As viewed in a side view of the vehicle, the battery case 50 is disposed such that the battery case 50 is surrounded by the front frames 21 and the pivot frames 24.

To be more specific, as viewed in a side view of the vehicle, the battery case 50 includes: a front surface portion 51 that extends along the sub frames 21b and the down frames 21c of the front frame 21; a ceiling surface portion 52 that extends rearward from an upper end of the front surface portion 51 along the upper frames 21a; a bottom surface portion (a bottom surface of the battery) 53 that extends from a lower end of the front surface portion 51 along an inclined shape of the ceiling surface portion 52; a rear surface portion 54 that connects a rear end of the ceiling surface portion 52 and a rear end of the bottom surface portion 53 to each other; a side surface portion 55 on a left side (see FIG. 1) that is disposed on a left side of the front surface portion 51, ceiling surface portion 52, the bottom surface portion 53 and the rear surface portion 54; and a side surface portion 56 on a right side (see FIG. 2) that is disposed on a right side of the front surface portion 51, the ceiling surface portion 52, the bottom surface portion 53 and the rear surface portion 54.

The rear surface portion 54 has a stepped shape as viewed in the side view of the vehicle. More specifically, the rear surface portion 54 includes: a front side rear surface 54a that extends from a rear end of the ceiling surface portion 52 toward a lower side; a stepped surface 54b that extends from a rear end of the front side rear surface 54a toward a rear side; and a rear side rear surface 54c that extends from a rear end of the stepped surface 54b toward a lower side.

In the battery case 50, on a front end of the bottom surface portion 53, a front end fixing portion 57 that protrudes frontward and downward is formed. The front end fixing portion 57 is disposed between the battery support portions 21c1 of the left and right down frame 21c. A fixing member is made to pass through the battery support portion 21c1 in the vehicle width direction. With such a configuration, the front end fixing portion 57 is fixed to the battery support portion 21c1.

An upper end fixing portion 58 (see FIG. 6) that protrudes upward is formed on a rear end portion of the ceiling surface portion 52. As illustrated in FIG. 6, the upper end fixing portion 58 extends in the longitudinal direction. The upper end fixing portion 58 is formed on a center portion in the vehicle width direction. The upper end fixing portion 58 is fixed to the connecting portion 21a1 of the upper frame 21a at a front end side thereof. A rear end side of the upper end fixing portion 58 protrudes rearward from the front side rear surface 54a of the battery case 50. The upper end fixing portion 58 is fixed to an upper portion of the pivot frame 24 on a rear end side thereof.

A rear end fixing portion 59 that protrudes rearward is formed on the rear side rear surface 54c. The rear end fixing portion 59 is fixed to a lower portion of the pivot frame 24.

A lower end of the pivot frame 24 is positioned below the battery support portions 21c1 of the down frames 21c. The battery case 50 is supported by the down frames 21c and the pivot frames 24, and the battery case 50 of the battery 30 is disposed in an extending manner between the down frame 21c and the pivot frames 24. That is, the battery 30 is disposed such that a rear side of the bottom surface portion 53 is lower than a front side of the bottom surface portion 53. As viewed in a side view of the vehicle, the bottom surface portion 53 extends along a line L1 (see FIG. 1) that connects a lower end of the down frame 21c and a lower end of the pivot frame 24. An inclination angle that the bottom surface portion 53 makes with respect to a road surface (ground) R is set to an acute angle. Below the bottom surface portion 53, a space S1 having an approximately triangular shape as viewed in a side view of the vehicle that is formed by the front wheel 13, the road surface R and the bottom surface portion 53 is formed.

In this embodiment, the vehicle body of the electric two-wheeled vehicle 10 having the skeletal frame structure is formed of: the vehicle body frame 11 constituted of the pivot frame 24 of the front frame 21 and the rear frame 22; the battery case 50 that houses the battery 30; and the like.

Figure 7:
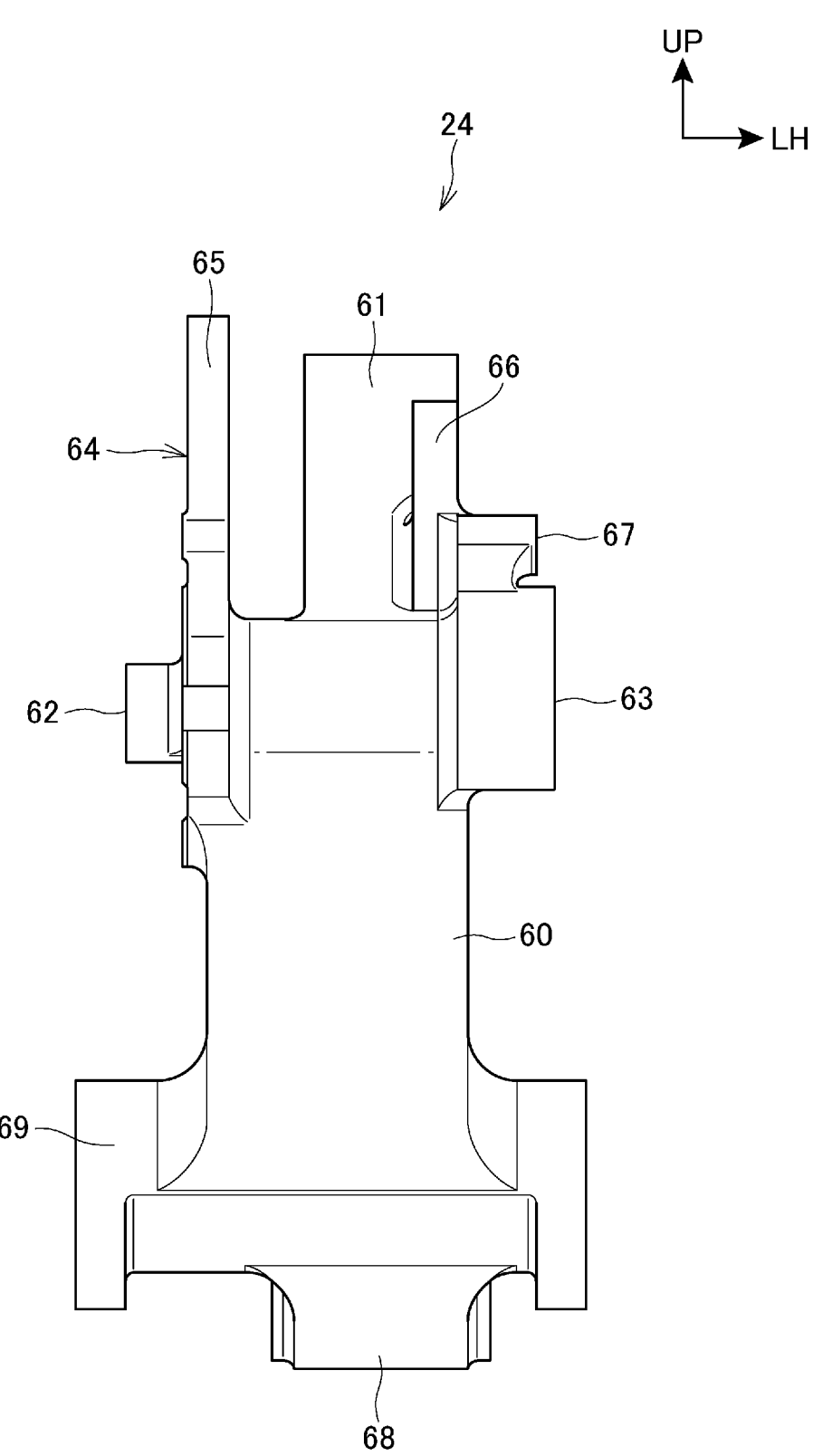
FIG. 7 is a front view of a pivot frame.
Figure 8:
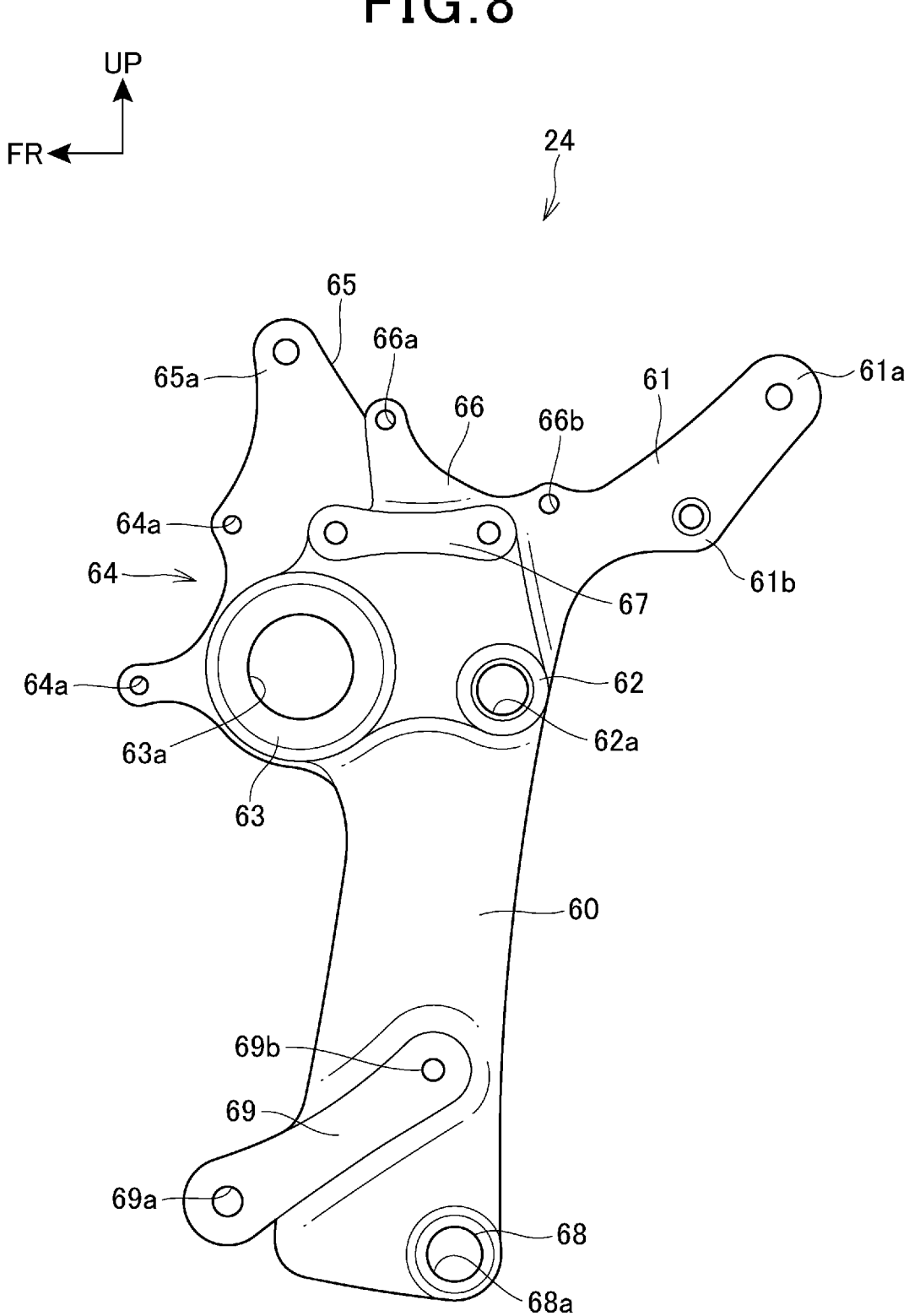
FIG. 8 is a left side view of the pivot frame.
Figure 9:
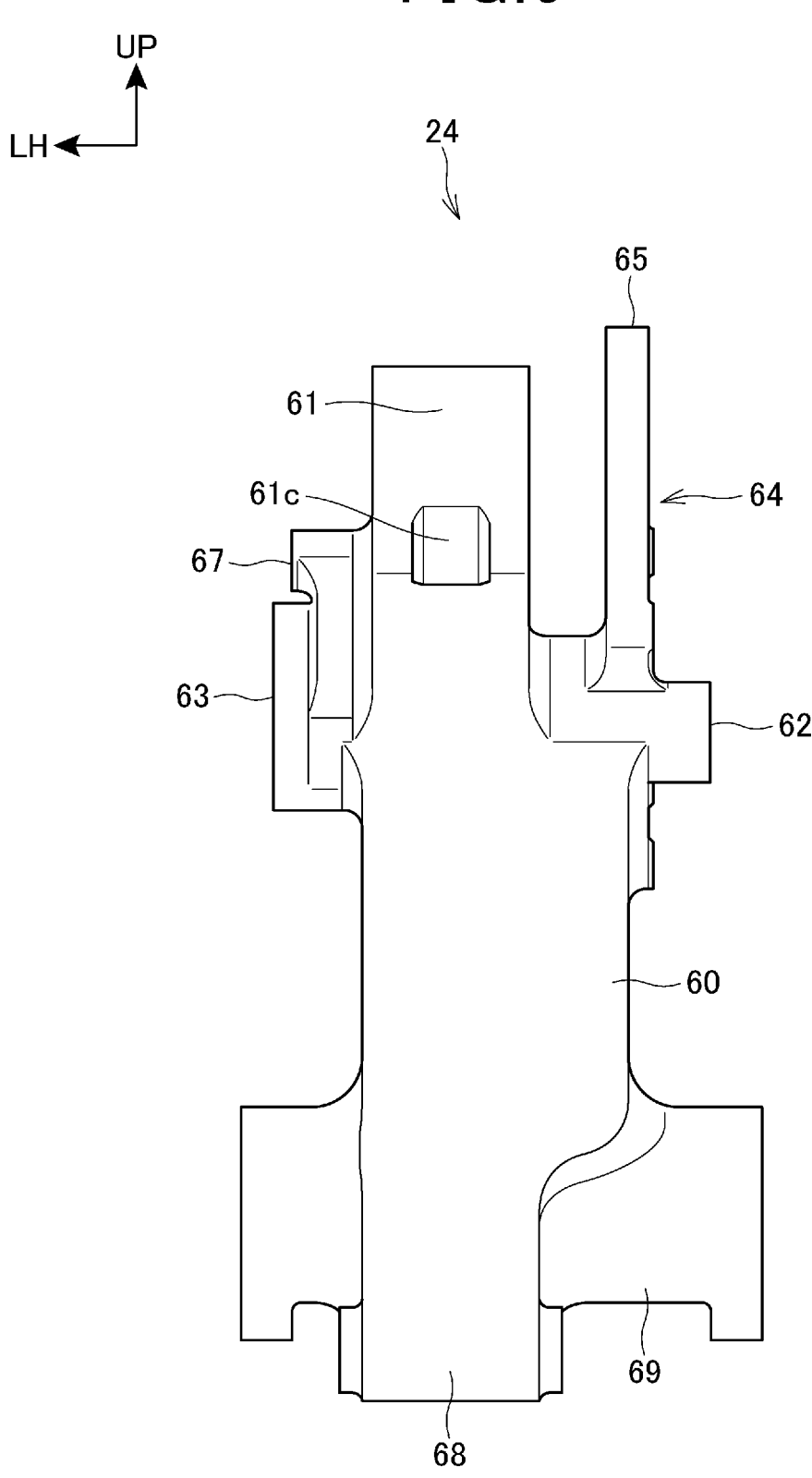
FIG. 9 is a rear view of the pivot frame.
Figure 10:
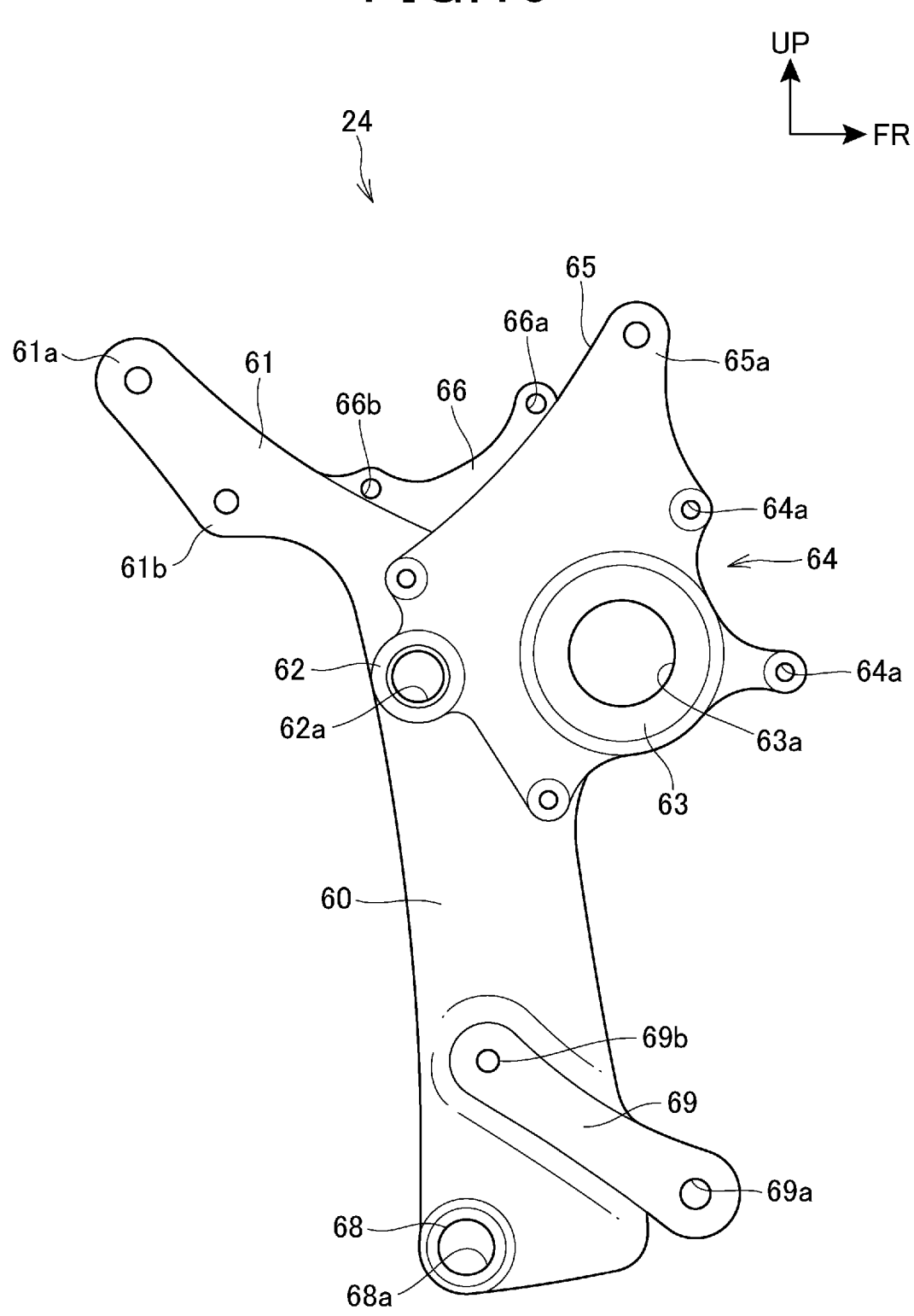
FIG. 10 is a right side view of the pivot frame.

FIG. 7 is a front view of the pivot frame 24. FIG. 8 is a left side view of the pivot frame 24. FIG. 9 is a rear view of the pivot frame 24. FIG. 10 is a right side view of the pivot frame 24.

The pivot frame 24 according to this embodiment is an integrally formed single frame having the solid structure.

The pivot frame 24 is a cast product, for example. The pivot frame 24 is solid and hence, the pivot frame 24 can ensure rigidity and a strength.

The pivot frame 24 according to this embodiment has a columnar portion 60 having an approximately quadrangular columnar shape that extends in the vertical direction. To be more specific, the columnar portion 60 is slightly inclined rearward as the columnar portion 60 advances upward. A rear arm portion (second arm) 61 that extends rearward and upward is formed on an upper side of the columnar portion 60. The rear arm portion 61 extends rearward along an outer periphery of the electric motor 12 (see FIG. 6). A frame fixing portion 61a in which a through hole that penetrates in the vehicle width direction (left and right direction) is formed on a distal end portion (a rear end portion) of the rear arm portion 61. A cushion connecting portion 61b in which a through hole that penetrates in the vehicle width direction is formed in a front lower portion of the frame fixing portion 61a. A cushion insertion portion 61c that is recessed upward is formed in a rear lower surface of the rear arm portion 61 corresponding to the cushion connecting portion 61b (see FIG. 9). The cushion connecting portion 61b and the cushion insertion portion 61c are formed at an intermediate portion of the rear arm portion 61 in the longitudinal direction.

Between the columnar portion 60 and the rear arm portion 61, a pivot shaft support portion 62 having a cylindrical shape that extends in the vehicle width direction is formed corresponding to a connecting portion between the columnar portion 60 and the rear arm portion 61. The pivot shaft support portion 62 protrudes toward a right side (the other side in the lateral direction) from the columnar portion 60 (see FIG. 9). A pivot shaft hole 62a that penetrates in the vehicle width direction is formed in the pivot shaft support portion 62.

An output shaft support portion 63 having a cylindrical shape is formed on a front side of the pivot shaft support portion 62. The output shaft support portion 63 protrudes toward a left side (one side in the lateral direction) from the columnar portion 60 (see FIG. 9). An output shaft hole 63a that penetrates in the vehicle width direction is formed in the output shaft support portion 63. The output shaft hole 63a has a larger diameter than the pivot shaft hole 62a.

A fastening plate 64 having a plate shape is formed around the output shaft support portion 63. A plurality of fastening holes 64a are formed in an outer peripheral portion of the fastening plate 64. The fastening plate 64 is spaced apart from the rear arm portion 61 in the vehicle width direction (see FIGS. 7 and 9). The fastening plate 64 is formed in an offset manner toward a right side from the columnar portion 60 (see FIGS. 7 and 9). The fastening plate 64 is formed in an offset manner toward a right side from a vehicle width center line L10 (see FIG. 11). The fastening plate 64 has a smaller lateral width than the rear arm portion 61. The fastening plate 64 has a front arm portion (first arm) 65 that extends frontward along an outer periphery of the electric motor 12 (see FIG. 6). An upper edge of the front arm portion 65 is bent in a downwardly recessed manner along an outer periphery of the electric motor 12. A battery fixing portion 65a is formed in a distal end (a front end) of the front arm portion 65 by forming a through hole that penetrates in the vehicle width direction.

A motor fixing lug 66 that protrudes upward is formed between the rear arm portion 61 and the front arm portion 65 (see FIG. 10). A plurality of fastening portions 66a, 66b that penetrate in the vehicle width direction are formed in the motor fixing lug 66. Below the motor fixing lug 66, a seat portion 67 that protrudes toward a left side is formed (see FIG. 8). The seat portion 67 extends in the longitudinal direction.

A link connecting portion 68 having a cylindrical shape is formed on a rear portion of a lower end of the columnar portion 60. A link shaft hole 68a that penetrates in the vehicle width direction is formed in the link connecting portion 68.

Plate fixing portions 69 having a plate shape that extend in the vehicle width direction are formed on a front upper side of the link connecting portion 68. The plate fixing portions 69 protrude from both outer sides of the columnar portion 60 in the vehicle width direction (see FIG. 7 and FIG. 9). The plate fixing portions 69 protrude toward outside in the vehicle width direction from the pivot shaft support portion 62 and the output shaft support portion 63. The plate fixing portions 69 are gradually inclined downward as the plate fixing portions 69 advance frontward. Front ends of the plate fixing portions 69 protrude frontward from the columnar portion 60. A battery fixing hole 69a that penetrates in the vehicle width direction is formed on front end portions of the plate fixing portions 69, respectively. A plate fastening hole 69b that is recessed in the vehicle width direction is formed on rear end portions of the plate fixing portion 69, respectively.

In FIG. 6, the pivot frame 24 is connected to the front frames 21, the seat sub frames 23b of the rear frames 22, the electric motor 12 and the battery 30.

That is, in the pivot frames 24, at the front arm portions 65 and the rear arm portions 61 disposed along an outer periphery of the electric motor 12, to the battery fixing portion 65a of the front arm portions 65 (see FIG. 8), upper end fixing portions 58 of the battery case 50 and the electric motor 12 are fastened. Further, to the frame fixing portions 61a of the rear arm portions 61 (see FIG. 8), lower ends of the seat sub frames 23b are connected.

Further, at the pivot frames 24, the electric motor 12 and the like are fixed to the fastening plates 64 (see FIG. 8) and the motor fixing lugs 66 (see FIG. 8).

Further, at the pivot frame 24, the rear end fixing portion 59 of the battery case 50 is disposed between the left and right plate fixing portions 69, and the battery case 50 is fixed to the left and right plate fixing portions 69.

With such a configuration, the pivot frame 24 forms an integral shape together with the front frames 21, the rear frames 22 and the battery case 50. Since the pivot frames 24 form an integral shape with the battery case 50, the rigidity of the pivot frames 24 each having a narrow width can be enhanced.

With reference to FIG. 1 to FIG. 5, the pivot shaft 26 is supported by the pivot shaft support portion 62 of the pivot frame 24. The pivot shaft 26 penetrates the pivot shaft hole 62a (see FIG. 8), and protrudes toward both left and right sides of the pivot frame 24. The swing arm 17 is swingably supported by both end portions of the pivot shaft 26.

As illustrated in FIG. 5, the swing arm 17 has a pair of left and right pivot portions 71, 72 that extends in the longitudinal direction. The pivot portions 71, 72 are respectively disposed on both sides of the pivot frame 24 in the vehicle width direction. The pivot portions 71, 72 are swingably supported by way of the pivot shaft 26.

The pivot portion 71, 72 extend rearward from the pivot shaft 26. In such a configuration, the pivot portion 72 on the right side extends rearward from the pivot shaft 26, and is inclined toward a left side as the pivot shaft 26 advances rearward. The pivot portion 72 on the right side is connected to the pivot portion 71 on the left side at a rear end portion thereof.

An arm portion 73 that extends rearward is formed on the rear end portion of the pivot portion 72 on the right side. The arm portion 73 extends rearward in a bending manner such that the arm portion 73 is rounded around the outside (left side) in the vehicle width direction. The rear wheel 16 is supported on a rear end portion of the arm portion 73 by way of the real wheel shaft 16*a*. The swing arm 17 supports the rear wheel 16 in a cantilever manner.

A link connecting portion 74 that protrudes downward is formed at a connecting portion between the pivot portion 71 on the left side and the pivot portion 72 on the right side. The link mechanism 27 is connected to the link connecting portion 74. With such a configuration, the rear cushion 28 is connected to the swing arm 17 by way of the link mechanism 27.

As illustrated in FIG. 1 to FIG. 5, the rear cushion 28 has a cylindrical shape extending in the vertical direction in an external appearance. The rear cushion 28 is connected to the pivot frame 24 above the pivot shaft 26. The rear cushion 28 is disposed between the left and right pivot portions 71, 72 of the swing arm 17 (see FIG. 5). The rear cushion 28 extends from an upper side to a lower side of the swing arm 17. Connecting portions 28*a*, 28*b* (see FIG. 6) are formed on upper and lower portions of the rear cushion 28. A hole that extends in the vehicle width direction is formed in the connecting portions 28*a* and 28*b*, respectively. The connecting portion 28*a* of the rear cushion 28 on an upper side is swingably supported on the cushion connecting portion 61*b* (see FIG. 8) by a shaft extending in the vehicle width direction in a state where the connecting portion 28*a* is inserted into the cushion insertion portion 61*c* (see FIG. 9) of the pivot frame 24. The connecting portion 28*b* of the rear cushion 28 on a lower side is swingably supported on the link mechanism 27.

As illustrated in FIG. 5 and FIG. 6, the link mechanism 27 includes: a cushion connecting portion 76 having an approximately triangular shape as viewed in a side view of the vehicle; and a pair of left and right links 77, 78 that is rotatably supported by the cushion connecting portion 76.

Swingable portions 76*a*, 76*b* are formed on the cushion connecting portion 76 at positions corresponding to vertices of an approximately triangular shape. More specifically, the cushion connecting portion 76 includes: the swingable portion 76*a* on a rear upper side; the swingable portion 76*b* on a front lower side disposed in front of and below the swingable portion 76*a*; and the swingable portion 76*c* on a rear lower side disposed behind the swingable portion 76*b* on the front lower side.

The swingable portion 76*a* on the rear upper side is swingably connected to the link connecting portion 74 on the swing arm 17. The connecting portion 28*b* of the rear cushion 28 on the lower side is swingably connected to the swingable portion 76*b* on the front lower side. The pair of left and right links 77, 78 is swingably connected to the swingable portion 76*c* on the rear lower side. The links 77, 78 extend frontward. The links 77, 78 are respectively arranged on both left and right sides of the link connecting portion 68 that forms a lower end portion of the pivot frame 24. The links 77, 78 are swingably connected to the link connecting portion 68 of the pivot frame 24.

That is, on the pivot frame 24, the connecting portion 28*a* that forms an upper end of the rear cushion 28 is supported and at the same time, the connecting portion 28*b* that forms a lower end of the rear cushion 28 is supported by way of the link mechanism 27. With such a configuration, the upper and lower ends of the rear cushion 28 that is mounted on the swing arm 17 are supported on one member that is referred to as the pivot frame 24. Accordingly, such a configuration can easily contribute to making the rear cushion 28 compact and to the accuracy management of the rear cushion 28.

The rear cushion 28 is extended or retracted by way of the link mechanism 27 and hence, swinging of the swing arm 17 is attenuated.

Figure 11:
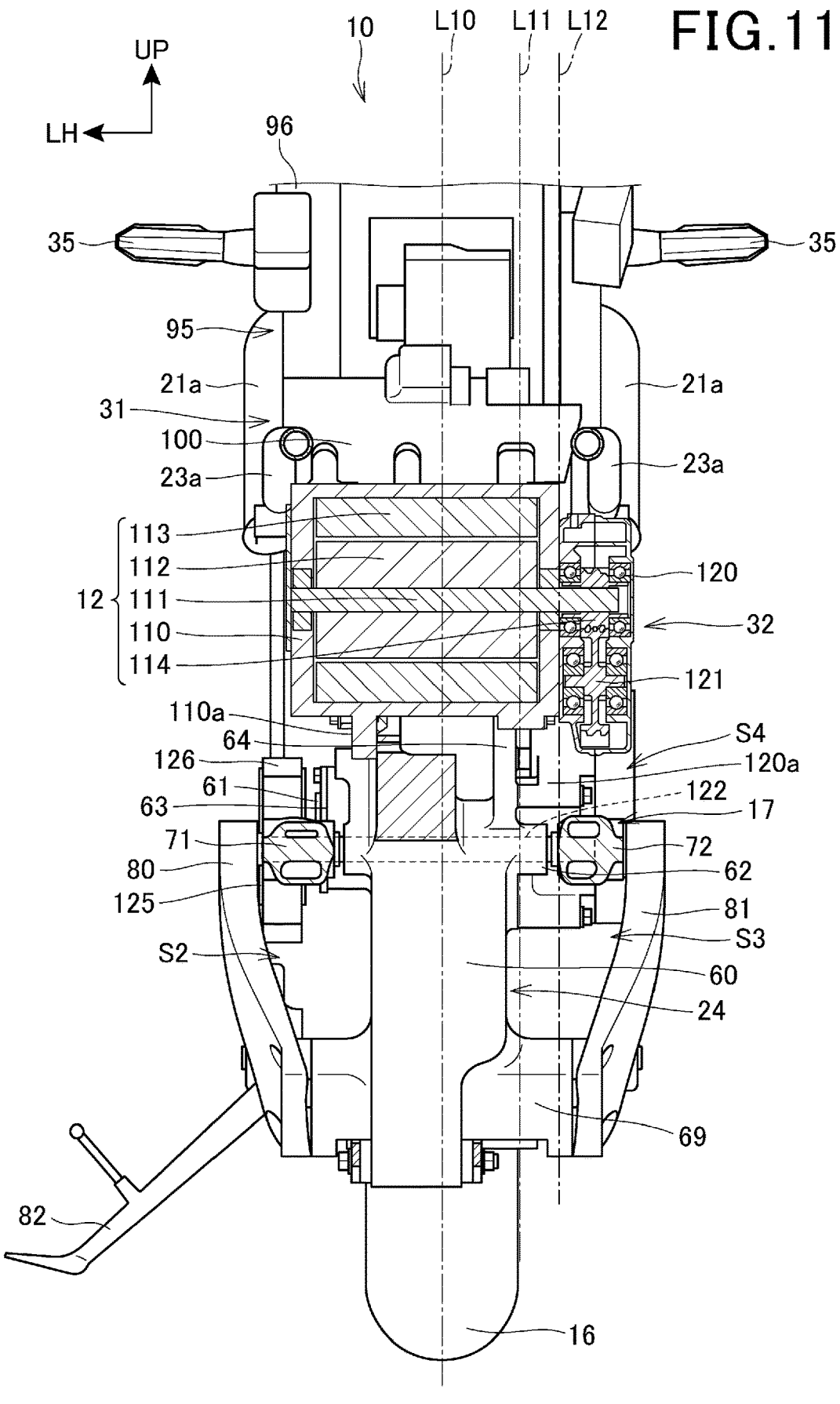
FIG. 11 is a cross-sectional view taken along a line XI-XI in FIG. 6.

FIG. 11 is a cross-sectional view taken along a line XI-XI in FIG. 6.

In the present embodiment, a pair of left and right pivot sub frames 80, 81 is respectively disposed both outsides the swing arm 17 in the vehicle width direction. The pivot sub frames 80, 81 are disposed outsides the pivot portions 71, 72 of the swing arm in the vehicle width direction. The pivot sub frames 80, 81 extend in the vertical direction. The pivot sub frames 80, 81 are bent toward the inside in the vehicle width direction as the pivot sub frames 80, 81 advance downward. Upper end portions of the pivot sub frames 80, 81 are supported on an end portion of the pivot shaft 26 (see FIG. 1, FIG. 2). Lower end portions of the pivot sub frames 80, 81 are fixed to the plate fixing portion 69 of the pivot frame 24. Predetermined spaces S2, S3 are formed between the pivot sub frames 80, 81 and the pivot frame 24.

A side stand 82 is rotatably supported on the pivot sub frame 80 on the left side. When the side stand 82 is installed on a road surface R in an upright state, it is possible support the vehicle body in an inclined state toward the side of the side stand 82.

Figure 12:
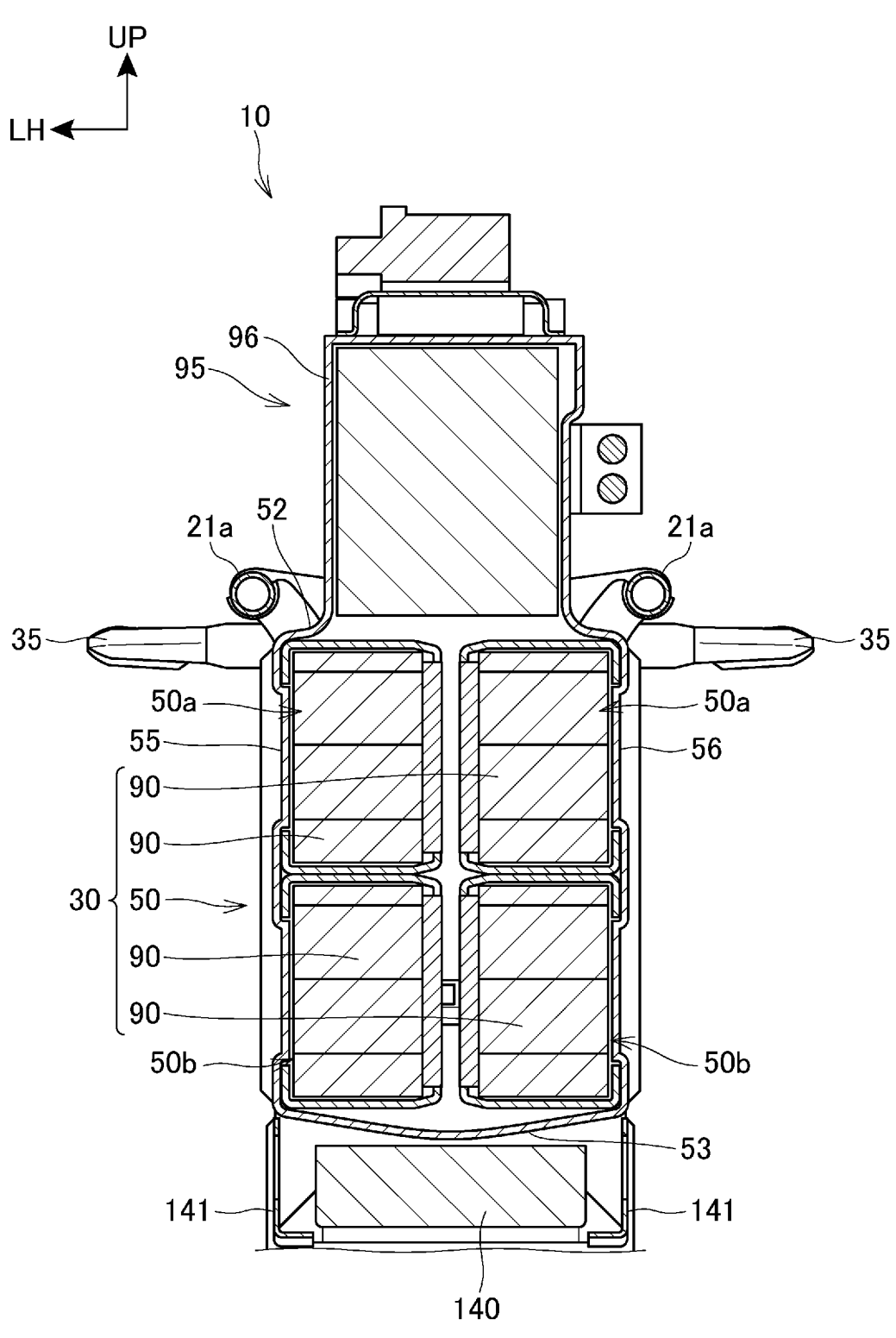
FIG. 12 is a cross-sectional view taken along a line XII-XII in FIG. 6.

FIG. 12 is a cross-sectional view taken along a line XII-XII in FIG. 6. FIG. 12 illustrates a cross section of the battery 30.

The battery 30 includes a battery case 50, and a plurality of battery units (battery bodies) 90 that are housed in the battery case 50.

In the inside of the battery case 50, battery housing portions 50*a*, 50*b* are formed in two stages, that is, in upper and lower stages. The battery housing portions 50*a*, 50*b* that are formed in two stages, that is, in upper and lower stages are respectively formed in pairs at left and right sides. Accordingly, in the inside of the battery case 50, four battery housing portions 50*a*, 50*b* are formed in total. The basic configuration of the battery housing portion 50*a* and the basic configuration of the battery housing portion 50*b* are substantially equal irrelevant to their positions. In the battery housing portions 50*a*, 50*b*, the battery units 90 that have substantially the same configuration are respectively housed in the battery housing portions 50*a*, 50*b*. The battery unit 90 has an elongated rectangular parallelepiped shape. The battery unit 90 is a portion that stores electricity, and is a main body portion of the battery 30 according to the present embodiment.

The battery housing portions 50*a* on the upper side are formed in front of the battery housing portions 50*b* on the lower side. That is, the battery housing portions 50*a* on the upper side are formed offset toward a front side than battery housing portions 50*b* on the lower side. In other words, as illustrated in FIG. 1 and FIG. 2, at the rear surface portion 54 of the battery case 50, the battery housing portion 50*a* on an upper side is formed by a space extending frontward from a front side rear surface 54*a*. Further, the battery housing portion 50*b* on a lower side is formed by a space extending frontward from a rear side rear surface 54*c*. With such a configuration, in the battery case 50, the upper and lower battery units 90 are arranged in a vertically overlapping manner in a state where the upper and lower battery units 90 are offset in the longitudinal direction.

In FIG. 12, side surface portions 55, 56 of the battery case 50 are positioned inside upper frames 21a, 21a in the vehicle width direction. That is, the side surface portions 55, 56 of the battery case 50 are positioned inside outer ends of upper frames 21a, 21a in the vehicle width direction, and are substantially positioned inside inner ends of the upper frames 21a in the vehicle width direction. With such a configuration, a bulging shape of the battery case 50 in the vehicle width direction can be suppressed.

In the battery 30, heat of the battery units 90 is radiated via the battery case 50. A traveling air impinges on the battery case 50 and cools the battery case 50. With such a configuration, in this embodiment, a radiator 130 is disposed below the bottom surface portion 53 of the battery case 50 and hence, the battery case 50 is positioned where the battery case 50 is minimally affected by discharge air from the radiator 130 and the like. Accordingly, the battery case 50 is easily cooled by traveling air. Although the case is illustrated where the battery case 50 has a flat planar surface shape, cooling fins may be formed on the battery case 50. For example, the configuration may be adopted where cooling fins may be formed on the side surface portions 55, 56 thus cooling the battery case 50 by travelling air outside the battery case 50.

A junction box (a power distribution box) 95 is disposed above the battery case 50. The junction box 95 includes: a body portion in which various electronic component parts not illustrated in the drawing such as a contactor, a main fuse, a current sensor are mounted; and an exterior case 96 that covers the body portion. Predetermined wirings that extend from an electric harness 97 (see FIG. 6) are connected to the junction box 95. The junction box 95 is formed in an approximately rectangular shape. The junction box 95 is shorter than one battery unit 90 in the longitudinal direction, and is larger than one battery unit 90 in the lateral direction. The junction box 95 is smaller than two battery units 90 arranged laterally. That is, the junction box 95 is shorter than the battery case 50 in the longitudinal direction. Further, the lateral width of the junction box 95 is narrower than the lateral width of the battery case 50. The junction box 95 extends upward between the pair of upper frames 21a. In the embodiment, the exterior case 96 is integrally formed with the battery case 50, and extends upward from the ceiling surface portion 52.

As illustrated in FIG. 6, the PCU 31 is disposed behind the junction box 95 and above the battery case 50. The PCU 31 includes a PCU case 100. The PCU case 100 has a rectangular parallelepiped shape. The PCU case 100 has a rectangular parallelepiped shape extending along the ceiling surface portion 52 of the battery 30. The electric motor 12 is disposed behind the PCU case 100.

The electric motor 12 is disposed behind the PCU 31. The electric motor 12 is disposed above the pivot frame 24 and just above the pivot shaft 26.

As illustrated in FIG. 11, the electric motor 12 includes a cylindrical motor case 110. A motor shaft 111 that extends in the vehicle width direction is rotatably supported by the motor case 110. A rotor 112 is fixed to the motor shaft 111. A stator 113 having a coil portion is supported outside the rotor 112 in a radial direction. The motor shaft 111 protrudes toward a right side of the motor case 110. A drive gear 114 is supported on a distal end of the motor shaft 111 on a right side. The drive gear 114 is connected to an input gear 121 of the speed reduction gear 32.

The motor case 110 is fixed to the PCU case 100 by a fixing jig from behind, and the PCU 31 and the electric motor 12 are integrally formed with each other (see FIG. 1, FIG. 2, and FIG. 6). A fixing lug 110a that is fixed to the pivot frame 24 is mounted on an outer peripheral portion of the motor case 110 of the electric motor 12. The fixing lug 110a is fastened to fastening portions 66a, 66b of the pivot frame 24 (see FIG. 9) and the like.

A lateral width of the electric motor 12 is formed larger than a lateral width of the pivot frame 24. More specifically, the lateral width of the electric motor 12 is formed larger than the lateral width from a right end of the pivot shaft support portion 62 to a left end of the output shaft support portion 63. With such a configuration, a space S4 is formed below the electric motor 12 and on a right side of the pivot frame 24. The speed reduction gear 32 is disposed in the space S4. The speed reduction gear 32 is disposed in a state where the speed reduction gear 32 advances to the stepped surface 54b of the battery case 50 (see FIG. 2). As viewed in a side view of the vehicle body, the speed reduction gear 32 extends rearward and upward, and is disposed on a side (a right side) of the electric motor 12.

Conventionally, for example, a vehicle width of an electric two-wheeled vehicle depends on a size of stacking of four layers consisting of an electric motor, a speed reduction gear, and left and right pivot frames. On the other hand, with such a configuration, in this embodiment, the pivot frame 24 is smaller than the lateral width of the electric motor 12, the vehicle width of the electric two-wheeled vehicle 10 is made to fall within stacking of two layers consisting of the electric motor 12 and the speed reduction gear 32 and hence, the lateral width (vehicle width) of the electric two-wheeled vehicle 10 can be easily made small.

The speed reduction gear 32 includes a speed reduction gear case (case) 120, the input gear 121, an output gear (not illustrated in the drawing), and an intermediate gear disposed between the input gear 121 and the output gear.

In this embodiment, the speed reduction gear case 120 has the two-split (left and right halves) structure. The speed reduction gear case 120 is assembled by combining the left and right halves in an overlapping manner in the lateral direction. In the inside of the speed reduction gear case 120, the input gear 121, the output gear and the like are rotatably disposed. With such a configuration, the rotation of the input gear 121 can be outputted from the output gear at a desired speed reduction ratio.

The speed reduction gear case 120 is fastened to the motor case 110 of the electric motor 12, the fastening plate 64 (see FIG. 8) of the pivot frame 24 and the like from the outside in the vehicle width direction.

In FIG. 11, a line L12 that passes a connecting plane between the motor case 110 of the electric motor 12 and the speed reduction gear case 120 of the speed reduction gear 32 and a line L11 that passes a side surface of the fastening plate 64 of the pivot frame 24 are spaced apart from each other in the vehicle width direction. The speed reduction gear case 120 includes a protruding portion 120a that protrudes toward the fastening plate 64 of the pivot frame 24. With the provision of the protruding portion 120a, the space S4 formed between electric motor 12 and the pivot frame 24 can be used as an arrangement space for the speed reduction gear 32.

An output gear is disposed in the protruding portion 120a of the speed reduction gear case 120. An output shaft 122 that extends in the vehicle width direction is fixed to the output gear. The output shaft 122 is made to pass through an output shaft support portion 63 (see FIG. 8) formed in the pivot frame 24. The output shaft 122 extends to both sides of the pivot frame 24 in the vehicle width direction.

A drive pulley 125 is disposed on the output shaft 122 on a side opposite to the speed reduction gear 32 in the vehicle width direction (see FIG. 1). The drive pulley 125 is integrally rotated with the output shaft 122. A drive belt (belt) 126 having an endless strip shape is wound around the drive pulley 125. The drive belt 126 extends rearward, and is wound around a driven pulley 127 fixed to the rear wheel shaft 12a. The drive belt 126 is positioned above and below the pivot portion 71 of the swing arm 17 on a left side as viewed in a side view of the vehicle body.

The power transmission mechanism 33 according to the present embodiment is formed of the drive pulley 125, the drive belt 126 and the driven pulley 127.

In the present embodiment, the pivot shaft 26 and the output shaft 122 are supported by the pivot frame 24 and hence, it is possible to easily ensure accuracy in mounting the pivot shaft 26 and the output shaft 122. Accordingly, an accuracy control in assembling a drive system relating to the output shaft 122 and a swing system relating to the pivot shaft 26 can be easily performed.

In the above-mentioned configuration, as viewed in a side view of the vehicle, the output shaft support portion 63 is positioned above the line L3 that connects the pivot shaft 26 and the rear wheel shaft 16a. With such a configuration, with respect to the drive belt 126 wound around the drive pulley 125, sinking of the drive belt 126 and a change in a circumferential length of the drive belt 126 in the extending direction can be made substantially equal and hence, even with the use of the power transmission mechanism 33 that uses the drive belt 126, the pivot shaft 26 and the output shaft 122 are provided as separate shafts and hence, accuracy in tension can be easily acquired.

Figure 13:
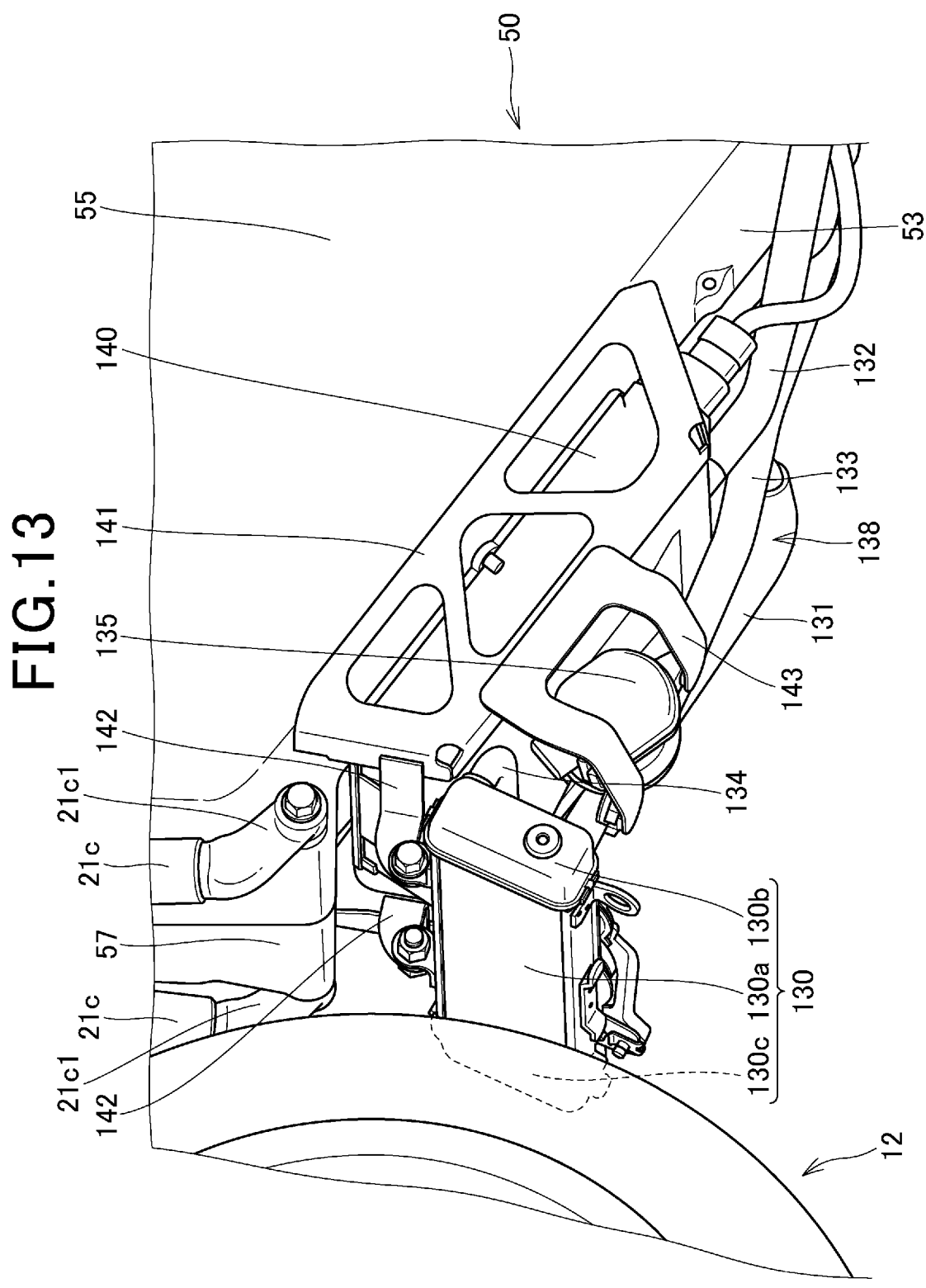
FIG. 13 is a perspective view illustrating a periphery of a lower portion of a battery case as viewed from a front left side.

FIG. 13 is a perspective view illustrating the surrounding of a lower portion of the battery case 50 as viewed from a front left side.

Below the battery case 50, a radiator 130 that cools electric vehicle functional parts. More specifically, the radiator 130 is disposed below an onboard charger 140 that is supported below the battery case 50. As electric vehicle functional parts, in the present embodiment, the electric motor 12, the PCU 31, and the onboard charger (charger) 140 are named. That is, in the present embodiment, the bottom surface portion 53 is obliquely disposed and hence, the space S1 is formed below the battery 30, and the radiator 130 can be disposed in the space S1. Further, the space S1 is sufficiently large and hence, the onboard charger 140 may be disposed in the space S1. However, by disposing the onboard charger 140 such that the onboard charger 140 is supported on the bottom surface bracket 141, the onboard charger 140 can be laid out in a compact manner.

Particularly, in the present embodiment, a lowermost portion 130d (see FIG. 1) of the radiator 130 is positioned below a line L3 that connects a front wheel axis 13a and a rear wheel axis 16a as viewed in a side view of the vehicle. The radiator 130 can be disposed in a dead space formed below the vehicle.

Here, the radiator 130 is disposed above an extension L4 of the down frame 21c as viewed in a side view of the vehicle. With such a configuration, the radiator 130 can be disposed at a position on a front side of the vehicle where the radiator 130 easily receive travelling air. Further, the arrangement of the radiator 130 can be laid out following the shape of the frame. Still further, as viewed in a side view of the vehicle, the radiator 130 is positioned above a rear end of the bottom surface portion 53 of the battery 30, and below a front end of the bottom surface portion 53 of the battery 30, and is disposed behind the front wheel 13. That is, assuming a horizontal line that passes a rear end of the bottom surface portion 53 of the battery 30 as a rear end line L5 and a horizontal line that passes a front end of the bottom surface portion 53 of the battery 30 as a front end line L6, as viewed in a side view of the vehicle, the radiator 130 is disposed above the rear end line L5 and below the front end line L6, and is disposed behind the front wheel 13. By disposing the radiator 130 behind the front wheel 13 where the width of the radiator 130 in the vehicle width direction is liable to become narrow, the radiator 130 can easily receive traveling air.

To describe the specific arrangement structure of the radiator 130, a pair of left and right bottom surface brackets (brackets) 141 is fixed to the bottom surface portion 53. The bottom surface brackets 141 extend in the longitudinal direction. In each bottom surface bracket 141, a plurality of wall thinning holes having a triangular shape that penetrate in the lateral direction are formed. The onboard charger 140 having a rectangular parallelepiped shape is disposed between the left and right bottom surface brackets 141. The onboard charger 140 is supported on the left and right bottom surface brackets 141. The onboard charger 140 is inclined forward and downward along the bottom surface portion 53. The onboard charger 140 is electrically connected to the battery 30. The onboard charger 140 converts an alternating current power to a direct current power, and supplies the direct current power to the battery unit 90.

On a front end of the bottom surface bracket 141, a bracket stay (bracket) 142 that extends frontward and downward are mounted. The radiator 130 is fastened to the bracket stay 142. The radiator 130 is supported by the bottom surface bracket 141 and the bracket stay 142 in a suspended manner on a front side below the bottom surface portion 53. The radiator 130 is disposed in the space S1 (see FIG. 1) having an approximately triangular shape surrounded by the front wheel 13, the bottom surface portion 53 of the battery case 50 and a road surface R. The radiator 130 is supported by the bottom surface bracket 141 and the bracket stay 142 and hence, even below the vehicle, the radiator 130 can be supported in a compact manner.

The radiator 130 includes: a core 130a having a plate shape in external appearance and extending in the vehicle width direction; a tank 130b disposed on a left side of the core 130a; and a tank 130c disposed on a right side of the core 130a. With respect to the core 130a into which traveling air flows, a lower portion of the core 130a is disposed in front of an upper portion of the core 130a. That is, the core 130a is inclined upward as a front surface thereof advances rearward. The core 130a faces the front wheel 13 below the front wheel axis 13a. With respect to the front surface of the core 130a, a lower portion is positioned in front of an upper portion, the radiator 130 can receive traveling air while preventing sands or the like adhering to the front wheel 13 from advancing toward the front surface of the radiator 130.

As illustrated in FIG. 5, to the tank 130c disposed on the right side of the radiator 130, a first cooling pipe 131 that extends rearward is connected. A downstream end of the first cooling pipe 131 is connected to the onboard charger 140. A cooling path not illustrated in the drawing is formed on the onboard charger 140. A second cooling pipe 132 that extends rearward is connected to a discharge port that forms a downstream end of the cooling path of the onboard charger 140.

The second cooling pipe 132 that extends rearward, then, advances into the space S2 (see FIG. 11) formed between the pivot frame 24 and the pivot sub frame 81, and is routed toward a position above the battery case 50. The second cooling pipe 132 is routed to the position above the battery case 50 while being bent in a stepped manner along the rear surface portion 54 (see FIG. 1), a downstream end of the second cooling pipe 132 is connected to the PCU case 100. In the inside of the PCU case 100, a cooling path that communicates with the inside of the motor case 110 of the electric motor 12 is formed. As illustrated in FIG. 2, on a rear surface of the motor case 110 of the electric motor 12, a discharge port that forms a downstream end of the cooling path is formed, and a third cooling pipe 133 is connected to the discharge port.

The third cooling pipe 133 is routed on a right side of the pivot frame 24 and the swing arm 17 and are routed downward. The third cooling pipe 133 that routed downward passes through the space S3 (see FIG. 11) between the pivot frame 24 and the pivot sub frame 80, and is routed on a front side downward the bottom surface portion 53. As illustrated in FIG. 5, a front end portion of the third cooling pipe 133 is bent toward a left side, and is connected to an inflow portion 135a of a water pump 135 extending in an axial direction. The water pump 135 is fixed to the bottom surface bracket 141 on a left side by way of a pump bracket 143. The water pump 135 is driven by an electric motor (not illustrated in the drawing) that differs from the electric motor 12 for driving. The water pump 135 supply cooling water under pressure to the outside from a discharge portion 135b of the water pump 135 in a radial direction. A fourth cooling pipe 134 is connected to the discharge portion 135b of the water pump 135. A downstream end of the fourth cooling pipe 134 is connected to a tank 130b disposed on a left side of the radiator 130.

In this embodiment, a circulation path 138 through which cooling water circulates is constituted of the radiator 130, the onboard charger (electric vehicle functional part) 140, the PCU (electric vehicle functional part) 31, the electric motor (electric vehicle functional part) 12, the water pump 135, and the cooling pipes 131 to 134 that suitably connect these parts. In the circulation path 138, by driving the water pump 135, cooling water circulate in order of the onboard charger 140, the PCU 31, and the electric motor 12 so as to cool these parts. In such a configuration, a heat value is increased in an ascending order of onboard charger 140, the PCU 31 and the electric motor 12. Accordingly, by allowing cooling water to pass through the onboard charger 140, the PCU 31 and the electric motor 12 in this order, even when a temperature of cooling water rises, such cooling water is allowed to flow toward a downstream side at a high temperature and hence, these parts can be efficiently cooled.

Particularly, the onboard charger 140 that is cooled first is disposed on the bottom surface portion 53 together with the radiator 130, and the onboard charger 140 is disposed near the radiator 130. With such a configuration, cooling water that is cooled by the radiator 130 can be speedily supplied to the onboard charger 140. Accordingly, compared to a case where the radiator 130 and the respective electric vehicle functional parts are disposed in a spaced-apart manner from each other, the compact circulation path 138 can be easily routed.

On a back surface of the radiator 130, a radiator fan (air cooling fan) 136 having a circular shape is disposed. The radiator fan 136 is disposed on a right side in the vehicle width direction, and is disposed close to the tank 130c side on a right side. The radiator fan 136 generates a negative pressure between the radiator fan 136 and the radiator 130, and introduces cooling air into the radiator 130 from a front side of the radiator 130. The cooling air that cools cooling water by the radiator 130 is discharged rearward by the radiator fan 136. The radiator fan 136 and the water pump 135 are disposed behind the radiator 130 and between the radiator 130 and the battery 30. With such a configuration, the radiator fan 136 and the water pump 135 can be disposed in the space S1 formed below the battery 30 in a compact manner. Particularly, the radiator fan 136 is disposed close to the tank 130c on a right side, and is disposed at a position away from the water pump 135. With such a configuration, the radiator fan 136 and the water pump 135 can be efficiently disposed thus facilitating the compact arrangement of these parts.

As illustrated in FIG. 6, above the junction box 95, a front electricity supply unit 98 is disposed. The front electricity supply unit 98 includes an upper surface electricity supply port 99 that is connected to an external power supply. The upper surface electricity supply port 99 is formed in accordance with a predetermined regulation. The upper surface electricity supply port 99 includes a terminal for alternating current charging and a terminal for direct current charging. The upper surface electricity supply port 99 is directed upward. The upper surface electricity supply port 99 is electrically connected to the onboard charger 140 and the battery 30.

Around the front electricity supply unit 98, an alternating current charging cable 150 is provided in a storable manner. In this embodiment, the alternating current charging cable 150 is storable in the electric two-wheeled vehicle 10 in a state where the alternating current charging cable 150 is wrapped around the front electricity supply unit 98. The stored alternating current charging cable 150 is covered by a unit cowl 41 that is detachably formed (see FIG. 1).

In the present embodiment, the alternating current charging cable 150 includes: an electricity supply gun portion 151 that is connected to the upper surface electricity supply port 99; a power cable portion 152 extending from the electricity supply gun portion 151; and a plug portion 153 connected to the other end of the power cable portion 152. With respect to the alternating current charging cable 150, the electricity supply gun portion 151 is connected to the upper surface electricity supply port 99 from above, and the plug portion 153 is connected to a so-called family-use socket. With such a configuration, alternating current power is supplied to the upper surface electricity supply port 99, and electricity is charged to the battery 30 via the onboard charger 140.

Figure 14:
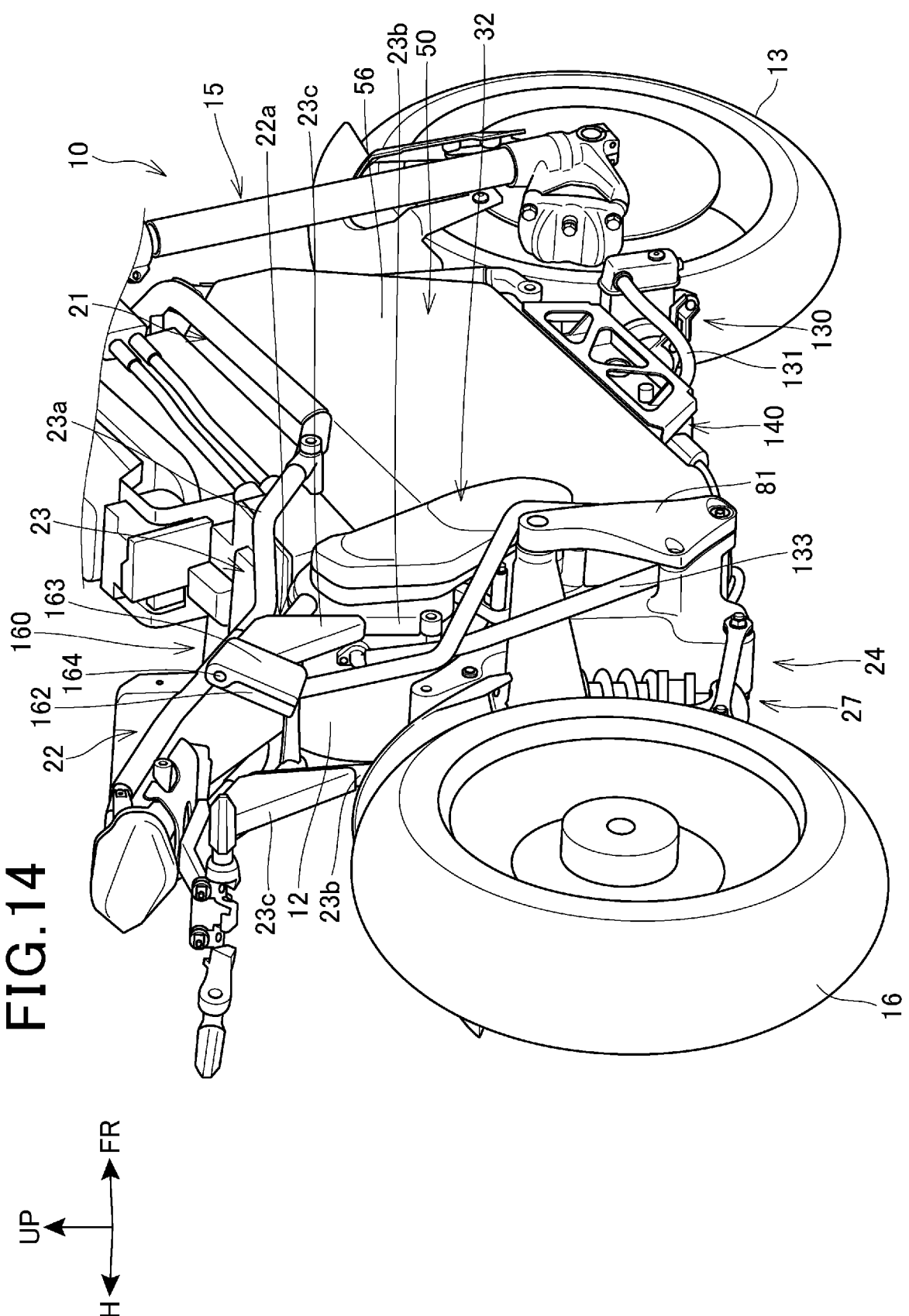
FIG. 14 is a perspective view illustrating a main part of the electric two-wheeled vehicle as viewed from a right rear side in which the illustration of the vehicle body cover is omitted.

FIG. 14 is a perspective view illustrating a main part of the electric two-wheeled vehicle 10 as viewed from a right rear side in a state where the vehicle body cover 40 is not illustrated in the drawing.

A side electricity supply unit 160 is supported on the rear frame 22. The side electricity supply unit 160 is disposed on a right side surface of the vehicle on a side opposite to the side stand 82. The side electricity supply unit 160 includes: a side electricity supply port (electricity supply port) 161 (see FIG. 2) that is connected to an external power source; a base cover 162 that embraces the side electricity supply port 161; an open-close cover 163 that is supported on the base cover 162 in an openable and closable manner about a hinge 164. The side electricity supply port 161 is formed based on a predetermined regulation. The side electricity supply port 161 includes a terminal for alternating current charging and a terminal for direct current charging. The side electricity supply port 161 is electrically connected to the onboard charger 140 and the battery 30. With respect to the side electricity supply unit 160, a normal direction N1 orthogonal to a connecting surface of the side electricity supply port 161, that is, an inserting direction toward the side electricity supply port 161 intersects with an extending direction L20 of the side stand 82 as viewed in a plan view (see FIG. 4). The side electricity supply unit 160 is disposed in front of a grab rail 23*d*.

Electricity can be supplied from the side of vehicle body by the side electricity supply unit 160. Accordingly, for example, in a case where the electric two-wheeled vehicle 10 is stopped on a side of a charging facility of a high-speed electricity station or the like, an external power supply provided to the charging facility can be connected to the side electricity supply unit 160 from the side. In such an operation, a user can connect the external power supply to the side electricity supply port 161 or remove the external power supply from the side electricity supply port 161 in a state where the electric two-wheeled vehicle 10 is brought into a stable state by grabbing the grab rail 23*d*.

Figure 15:
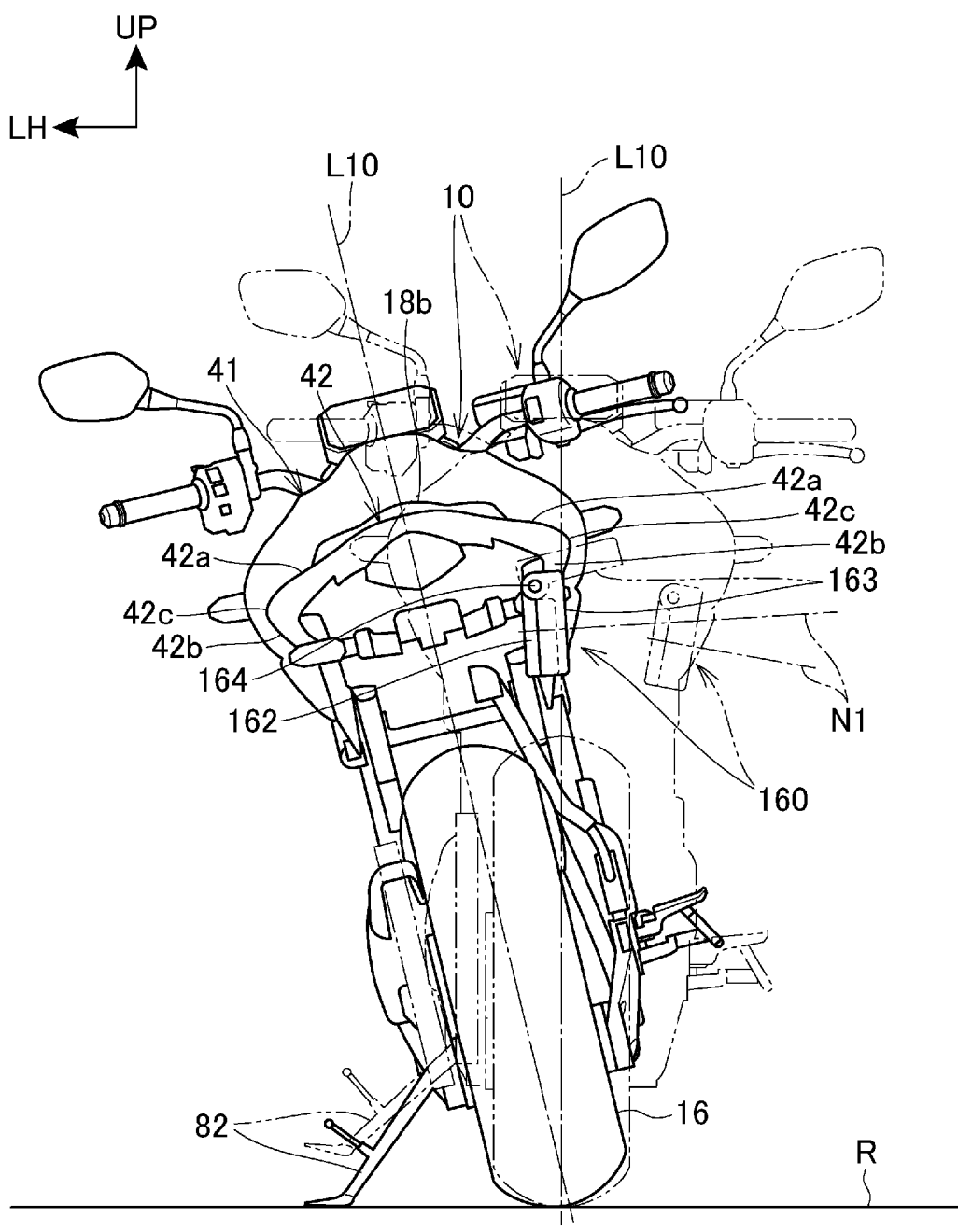
FIG. 15 is a rear view of the electric two-wheeled vehicle that uses a side stand.

FIG. 15 is a rear view of the electric two-wheeled vehicle 10 when the side stand 82 is used. In FIG. 15, a two-dot chain line indicates the electric two-wheeled vehicle 10 in an upright state. That is, the two-dot chain line indicates the state where the side stand 82 is not used. In this case, the vehicle width center line L10 is vertical to the road surface R. A solid line indicates a stopped state where the electric two-wheeled vehicle 10 uses the side stand 82. In this case, the vehicle width center line L10 is also inclined.

In the present embodiment, the side electricity supply unit 160 is disposed below a ridge line 42*c* of the rear cowl 42. Further, an outer surface of the side electricity supply unit 160 in the vehicle width direction is disposed along a lower surface 42*b* of the rear cowl 42. With such a configuration, the side electricity supply unit 160 can be disposed while suppressing a protruding shape thereof in the vehicle width direction. The lower surface 42*b* of the rear cowl 42 is directed downward and hence, it is possible to provide the side electricity supply port 161 at a position that is minimally apparent in external appearance.

The side electricity supply unit 160 is disposed at a connecting portion 22*a* where the seat rail 23*a* and the seat sub frame 23*b* are connected to each other. The connecting portion 22*a* is used in the context that an area near the position at which the extending direction of the seat rail 23*a* and the extending direction of the seat sub frame 23*b* intersect with each other. In other words, the connecting portion 22*a* may be also referred to as a portion that is supported by both of the seat rail 23*a* and the seat sub frame 23*b*. Accordingly, for example, the position that overlaps with the rear gusset 23*c* as viewed in a side view of the vehicle is the connecting portion 22*a*. In the present embodiment, the side electricity supply unit 160 is disposed such that the side electricity supply unit 160 overlaps with the rear gusset 23*c* as viewed in a side view of the vehicle body.

The side electricity supply unit 160 is disposed such that the normal direction N1 of the side electricity supply unit 160 is directed rightward and downward. That is, with respect to the electric two-wheeled vehicle 10 disposed in an upright state, the side electricity supply unit 160 is disposed such that the normal direction N1 is the direction that is spaced apart from the side stand 82 and is directed slightly downward as viewed in a rear view. In other words, the electric two-wheeled vehicle 10 in an upright state is disposed such that, when the vehicle body of the electric two-wheeled vehicle 10 is inclined by using the side stand 82, the normal direction N1 of the side electricity supply port 161 becomes at least perpendicular to the road surface R. That is, the normal direction N1 is rotated at an angle perpendicular to the road surface R or more so that the direction of the side electricity supply port 161 becomes an angle perpendicular to the road surface R or an angle of elevation with respect to the road surface R.

Accordingly, the side electricity supply unit 160 is disposed on the connecting portion 22*a* between seat rail 23*a* and the seat sub frame 23*b* and hence, the side electricity supply unit 160 is disposed at the position having rigidity referred to as the connecting portion 22*a* whereby an external power supply can be easily connected to the side electricity supply port 161. Particularly, the side electricity supply unit 160 according to the present embodiment is disposed on a side opposite to the side stand 82 and hence, the side stand 82 can easily receive a force generated in the connecting direction of the external power supply at the time of charging electricity. Further, the normal direction N1 of the side electricity supply port 161 is directed downward and hence, when the vehicle body takes an inclined posture, the side electricity supply port 161 is exposed to the side surface whereby an operator can easily get access to the side electricity supply port 161.

As has been described above, according to the first embodiment to which the present invention is applied, there is provided the electric two-wheeled vehicle 10 that includes: the vehicle body frame 11 including the down frame 21*c* and the pivot frame 24, the down frame 21*c* extending downward from the head pipe 20, the pivot frame 24 pivotally supporting the rear wheel 16; the battery 30 that is disposed in an extending manner between the down frame 21*c* and the pivot frame 24; and the radiator 130 that cools the electric vehicle functional parts. In such an electric two-wheeled vehicle 10, the battery 30 is disposed such that the rear side of the bottom surface portion 53 is lower than the front side of the bottom surface portion 53, and the radiator 130 is disposed below the bottom surface portion 53.

With such a configuration, even with respect to the electric two-wheeled vehicle 10, 210 that includes the battery 30 disposed between the down frame 21*c* and the pivot frame 24 in an extending manner, by disposing the bottom surface portion 53 obliquely, the space S1 can be formed below the battery 30 and hence, the radiator 130 can be disposed below the battery 30. Accordingly, in the electric two-wheeled vehicle 10 that includes the battery 30 disposed between the down frame 21*c* and the pivot frame 24 in an extending manner, it is possible to provide the arrangement structure of the radiator 130 that can easily receive traveling air.

In this embodiment, the radiator 130 is positioned above the rear end of the bottom surface portion 53 and below the front end of the bottom surface portion 53, and the radiator 130 is disposed behind the front wheel 13.

With such a configuration, the radiator 130 is disposed behind the front wheel 13 having a width in a vehicle width direction that is liable to be narrowed. Accordingly, the radiator 130 can easily receive traveling air and hence, cooling water can be easily cooled by the radiator 130.

Further, in this embodiment, the front surface of the radiator 130 is disposed such that the lower portion of the front surface is positioned in front of the upper portion of the front surface.

With such a configuration, the radiator 130 can receive traveling air while suppressing sand or the like adhering to the front wheel 13 from being brought into contact with the front surface of the radiator 130.

Further, in the present embodiment, the lower end of the pivot frame 24 is positioned below the lower end of the down frame 21*c*, and the bottom surface portion 53, as viewed in a side view of the vehicle, extends along the line L1 that connects the lower end of the down frame 21c and the lower end of the pivot frame 24.

With such a configuration, as viewed in a side view of the vehicle, the bottom surface portion 53 is made to follow the line L1 that connects the lower end of the down frame 21c and the lower end of the pivot frame 24 and hence, the space S1 can be ensured below the battery 30 on a front side of the vehicle, and the radiator 130 can be easily disposed in the space S1 whereby the external appearance of the electric two-wheeled vehicle 10, 210 can be enhanced.

Further, in the present embodiment, as viewed in a side view of the vehicle, the radiator 130 is disposed on the extension L4 of the down frame 21c.

With such a configuration, the radiator 130 can be easily disposed at the position where the radiator 130 easily receives traveling air on a front side of the vehicle, and the arrangement of the radiator 130 can be laid out in accordance with the frame shape.

Further, in the present embodiment, as viewed in a side view of the vehicle, the lowermost portion 130d of the radiator 130 is positioned below the line L3 that connects the front wheel shaft 13a and the rear wheel shaft 16a.

With such a configuration, the radiator 130 can be disposed in a dead space formed below the vehicle.

Further, in the present embodiment, the radiator 130 is supported by way of the bottom surface bracket 141 and the bracket stay 142 that extend from the bottom surface portion 53.

With such a configuration, the radiator 130 can be disposed below the vehicle in a state where the radiator 130 is supported in a compact manner.

Further, in the present embodiment, the onboard charger 140 is disposed between the radiator 130 and the bottom surface portion 53, and the onboard charger 140 is supported by way of the bottom surface bracket 141.

With such a configuration, the onboard charger 140 can be disposed in the dead space, and the onboard charger 140 is shared by the bottom surface bracket 141 on which the radiator 130 is supported. Accordingly, a compact layout is realized.

Further, in the present embodiment, the PCU 31 is disposed above the battery 30, the electric motor 12 is disposed above the pivot shaft 26 of the pivot frame 24 from which the rear wheel 16 is suspended and behind the PCU 31, the cooling pipes 131, 132, 133, 134 to which the onboard charger 140, the PCU 31 and the electric motor 12 are connected are connected to the radiator 130, and cooling water is circulated in order from the onboard charger 140, the PCU and the electric motor 12 or in ascending order according to a heat value thereof.

With such a configuration, the electric motor 12, the PCU 31, and the onboard charger 140 that are the electric vehicle functional parts and are objects to be cooled by the radiator 130 can be cooled in order from the part having a lower heat value to part having a higher heat value. Accordingly, various electric vehicle functional parts, that is, the electric motor 12, the onboard charger 140 and the PCU 31 can be efficiently cooled by one radiator 130.

At least in this embodiment, the PCU 31 to be cooled is disposed near the radiator 130 and hence, the compact circulation path 138 can be routed compared to a case where the radiator 130 and the respective electric vehicle functional parts are spaced apart from each other.

Further, in this embodiment, the radiator 130 includes a radiator fan 136, a water pump 135 is provided to the cooling pipes 131, 132, 133 and 134, and the radiator fan 136 and the water pump 135 are disposed behind the radiator 130 and between the radiator 130 and the battery 30.

With such a configuration, the radiator fan 136 and the water pump 135 can be disposed in a dead space generated below the battery 30 in a compact manner.

Second Embodiment

The second embodiment to which the present invention is applied is described. With respect to this second embodiment, parts that have substantially the identical configuration as the corresponding parts of the above-mentioned embodiment are not described while giving the same symbols.

Figure 16:
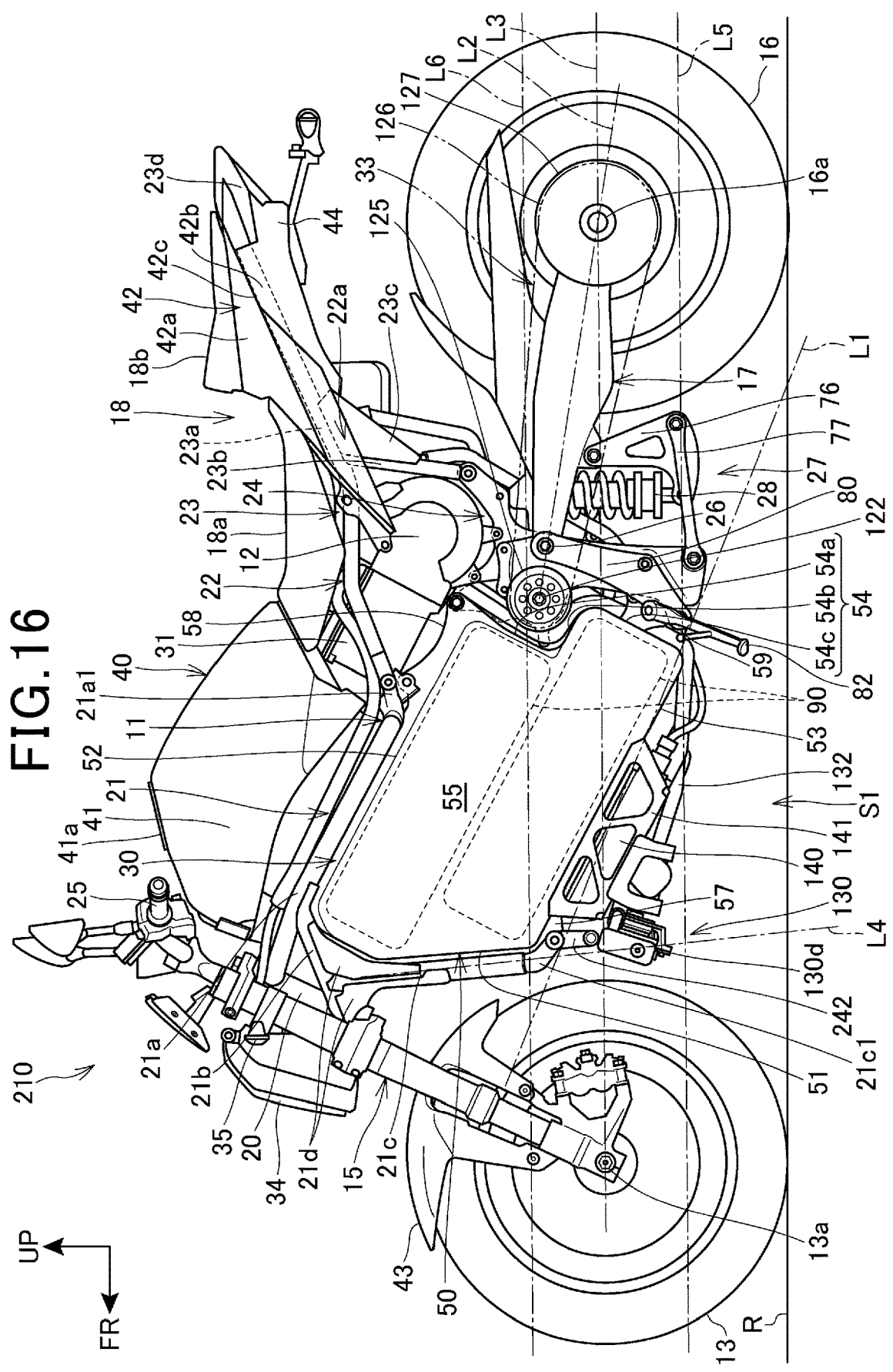
FIG. 16 is a left side view of an electric two-wheeled vehicle according to a second embodiment of the present invention.

FIG. 16 is a left side view of an electric two-wheeled vehicle 210 according to the second embodiment of the present invention.

In the electric two-wheeled vehicle 210 according to the second embodiment, in place of the bracket stays 142 of the first embodiment, the electric two-wheeled vehicle 210 includes bracket stays 242 that are supported on lower ends of the down frames 21c. The bracket stays 242 are provided as a left and right pair corresponding to the pair of left and right down frames 21c. The bracket stays 242 extend downward along an extension L4 of the down frames 21c. Upper ends of the bracket stays 242 are fastened to front end fixing portions 57 of the battery case 50 together with battery support portions 22c1 of the down frames 21c. A radiator 130 is fastened to lower ends of the bracket stays 242.

The second embodiment has substantially the same configuration as the first embodiment except for a point that the radiator 130 is supported in a suspending manner from the down frames 21c in place of the bottom surface bracket 141. Accordingly, also in the second embodiment to which the present invention is applied, it is possible to provide the arrangement structure of the radiator 130 that can easily receive travelling air in the electric two-wheeled vehicle 210 that includes a battery 30 extending between the down frames 21c and the pivot frames 24.

Particularly, in this embodiment, the radiator 130 is supported by way of the bracket stays 242 that extend from lower ends of the down frames 21c.

With such a configuration, the radiator 130 can be disposed below the vehicle by supporting the radiator 130 in a compact manner.

Other Embodiments

The above-mentioned embodiment exemplifies only one mode of the present invention and modifications and variations of the present invention can be made as desired without departing from the gist of the present invention.

In the above-mentioned embodiment, the description has been made by taking the electric two-wheeled vehicle 10, 210 having the front wheel 13 and the rear wheel 16 as the electric vehicle as an example. However, the present invention is not limited to such an electric two-wheeled vehicle. The present invention is applicable to a three-wheeled vehicle having two front wheels or two rear wheels or an electric saddle riding vehicle that includes four or more wheels.

Configurations That are Supported by the Above-Mentioned Embodiment

The above-mentioned embodiment supports the following configurations.

Configuration 1

An electric vehicle comprises: a vehicle body frame that includes a down frame and a pivot frame, the down frame extending downward from a head pipe, the pivot frame pivotally supporting a rear wheel; a battery that is disposed in an extending manner between the down frame and the pivot frame; and a radiator that cools an electric vehicle functional part. In the electric vehicle, the battery is disposed such that a rear side of a battery bottom surface is lower than a front side of the battery bottom surface, and the radiator is disposed below the battery bottom surface.

With such a configuration, even with respect to the electric vehicle that includes the battery disposed between the down frame and the pivot frame in an extending manner, by disposing the battery bottom surface obliquely, the space can be formed below the battery and hence, the radiator can be disposed below the battery. Accordingly, in the electric vehicle that includes the battery disposed between the down frame and the pivot frame in an extending manner, it is possible to provide the arrangement structure of the radiator that can easily receive travelling air.

Configuration 2

In the electric vehicle according to Configuration 1, the radiator is positioned above a rear end of the battery bottom surface and below a front end of the battery bottom surface, and the radiator is disposed behind a front wheel.

With such a configuration, the radiator is disposed behind the front wheel having a width in a vehicle width direction that is liable to be narrowed. Accordingly, the radiator can easily receive travelling air and hence, cooling water can be easily cooled by the radiator.

Configuration 3

In the electric vehicle according to Configuration 2, a front surface of the radiator is disposed such that a lower portion of the front surface is positioned in front of an upper portion of the front surface.

With such a configuration, the radiator can receive travelling air while suppressing sand or the like adhering to the front wheel from being brought into contact with the front surface of the radiator.

Configuration 4

In the electric vehicle according to any one of Configurations 1 to 3, a lower end of the pivot frame is positioned below a lower end of the down frame, and the battery bottom surface, as viewed in a side view of the vehicle, extends along a line that connects the lower end of the down frame and the lower end of the pivot frame.

With such a configuration, as viewed in a side view of the vehicle, the bottom surface of the battery is made to follow the line that connects the lower end of the down frame and the lower end of the pivot frame and hence, the space can be ensured below the battery on a front side of the vehicle, and the radiator can be easily disposed in the space whereby the external appearance of the electric vehicle can be enhanced.

Configuration 5

In the electric vehicle according to any one of Configurations 1 to 4, as viewed in a side view of the vehicle, the radiator is disposed on an extension of the down frame.

With such a configuration, the radiator can be easily disposed at the position where the radiator easily receives travelling air on a front side of the vehicle, and the arrangement of the radiator can be laid out in accordance with the frame shape.

Configuration 6

In the electric vehicle according to any one of Configurations 1 to 5, a lowermost portion of the radiator is positioned below a line that connects a front wheel shaft and a rear wheel shaft as viewed in a side view of the vehicle.

With such a configuration, the radiator can be disposed in a dead space formed below the vehicle.

Configuration 7

In the electric vehicle according to any one of Configurations 1 to 6, the radiator is supported by way of a bracket that extends from the battery bottom surface or from a lower end of the down frame.

With such a configuration, the radiator can be disposed below the vehicle in a state where the radiator is supported in a compact manner.

Configuration 8

In the electric vehicle according to Configuration 7, a charger is disposed between the radiator and the battery bottom surface, and the charger is supported by way of the bracket.

With such a configuration, the charger can be disposed in the dead space, and the charger is shared by the bracket on which the radiator is supported. Accordingly, the charger can be laid out in a compact manner.

Configuration 9

In the electric vehicle according to any one of Configurations 1 to 8, a PCU is disposed above the battery, a motor is disposed above a pivot shaft of the pivot frame from which the rear wheel is suspended and behind the PCU, a charger, the PCU, and a cooling channel to which the motor is connected are connected to the radiator, and cooling water is circulated in order from the charger, the PCU and the motor or in ascending order according to a heat value thereof.

With such a configuration, the electric vehicle functional parts that are objects to be cooled by the radiator can be cooled in ascending order according to the heat value thereof. Accordingly, various electric vehicle functional parts can be efficiently cooled by one radiator.

Configuration 10

In the electric vehicle according to Configuration 9, the radiator includes an air cooling fan, a water pump is provided to the cooling channel, and the air cooling fan and the water pump are disposed behind the radiator and between the radiator and the battery.

With such a configuration, the air cooling fan and the water pump can be disposed in a dead space generated below the battery in a compact manner.

REFERENCE SIGNS LIST

10: electric two-wheeled vehicle (electric vehicle)
11: vehicle body frame 12: electric motor (motor, electric vehicle functional part)
13: front wheel
13a: front wheel shaft
16: rear wheel
16a: rear wheel shaft
20: head pipe
21c: down frame
24: pivot frame (other frame)
26: pivot shaft
30: battery
31: PCU (electrical vehicle functional part)
53: bottom surface portion (battery bottom surface)
130: radiator
130d: lowermost portion
131: first cooling pipe (cooling channel)
132: second cooling pipe (cooling channel)
133: third cooling pipe (cooling channel)
134: fourth cooling pipe (cooling channel)
135: water pump
136: radiator fan (air cooling fan)
140: onboard charger (charger, electric vehicle functional part)
141: bottom surface bracket (bracket)
142: bracket stay (bracket)
210: electric two-wheeled vehicle (electric vehicle)
242: bracket stay (bracket)
L1: line
L3: line
L4: extension

The invention claimed is:

1. An electric vehicle comprising:
a vehicle body frame that includes a down frame and a pivot frame, the down frame extending downward from a head pipe, the pivot frame pivotally supporting a rear wheel;
a battery that is disposed in an extending manner between the down frame and the pivot frame; and
a radiator that cools an electric vehicle functional part, wherein the battery is disposed such that a rear side of a battery bottom surface is lower than a front side of the battery bottom surface, and
the radiator is disposed below the battery bottom surface; and
wherein the radiator is positioned above a rear end of the battery bottom surface and below a front end of the battery bottom surface, and the radiator is disposed behind a front wheel.

2. The electric vehicle according to claim 1, wherein a front surface of the radiator is disposed such that a lower portion of the front surface is positioned in front of an upper portion of the front surface.

3. The electric vehicle according to claim 1, wherein a lower end of the pivot frame is positioned below a lower end of the down frame, and
the battery bottom surface, as viewed in a side view of the vehicle, extends along a line that connects the lower end of the down frame and the lower end of the pivot frame.

4. The electric vehicle according to claim 1, wherein as viewed in a side view of the vehicle, the radiator is disposed on an extension of the down frame.

5. The electric vehicle according to claim 1, wherein a lowermost portion of the radiator is positioned below a line that connects a front wheel shaft and a rear wheel shaft as viewed in a side view of the vehicle.

6. The electric vehicle according to claim 1, wherein the radiator is supported by way of a bracket that extends from the battery bottom surface or from a lower end of the down frame.

7. The electric vehicle according to claim 6, wherein a charger is disposed between the radiator and the battery bottom surface, and
the charger is supported by way of the bracket.

8. The electric vehicle according to claim 1, wherein a PCU is disposed above the battery,
a motor is disposed above a pivot shaft of the pivot frame from which the rear wheel is suspended, and behind the PCU,
a charger, the PCU, and a cooling channel to which the motor is connected are connected to the radiator, and
cooling water is circulated in order from the charger, the PCU and the motor or in ascending order according to a heat value thereof.

9. The electric vehicle according to claim 8, wherein the radiator includes an air cooling fan,
a water pump is provided to the cooling channel, and
the air cooling fan and the water pump are disposed behind the radiator and between the radiator and the battery.

* * * * *